(12) United States Patent
Grubbs et al.

(10) Patent No.: US 6,884,859 B2
(45) Date of Patent: Apr. 26, 2005

(54) RING-OPENING METATHESIS POLYMERIZATION OF BRIDGED BICYCLIC AND POLYCYCLIC OLEFINS CONTAINING TWO OR MORE HETEROATOMS

(75) Inventors: Robert H. Grubbs, South Pasadena, CA (US); Oren A. Scherman, Pasadena, CA (US); Hyunjin M. Kim, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 139 days.

(21) Appl. No.: 10/232,105

(22) Filed: Aug. 29, 2002

(65) Prior Publication Data

US 2003/0100783 A1 May 29, 2003

Related U.S. Application Data

(60) Provisional application No. 60/316,114, filed on Aug. 29, 2001.

(51) Int. Cl.$^7$ .............................. C08F 4/44; B01J 31/22
(52) U.S. Cl. ....................... 526/135; 526/145; 526/170; 526/172; 526/190; 526/204; 502/152; 502/155; 502/167; 548/103; 556/21; 556/23; 556/136
(58) Field of Search ................................. 526/135, 145, 526/170, 172, 190, 192, 193, 204; 502/152, 155, 167; 548/103; 556/21, 23, 136

(56) References Cited

U.S. PATENT DOCUMENTS

| | | | |
|---|---|---|---|
| 5,312,940 A | 5/1994 | Grubbs et al. | |
| 5,342,909 A | 8/1994 | Grubbs et al. | |
| 5,831,108 A | 11/1998 | Grubbs et al. | |
| 5,849,851 A | 12/1998 | Grubbs et al. | |
| 5,880,231 A | 3/1999 | Grubbs et al. | |
| 5,917,071 A | 6/1999 | Grubbs et al. | |
| 5,939,504 A | 8/1999 | Woodson, Jr. et al. | |
| 5,969,170 A | 10/1999 | Grubbs et al. | |
| 6,020,443 A | 2/2000 | Woodson et al. | |
| 6,040,363 A | 3/2000 | Warner et al. | |
| 6,071,459 A | 6/2000 | Warner et al. | |

(Continued)

FOREIGN PATENT DOCUMENTS

WO    WO 02/079126 A1    10/2002

OTHER PUBLICATIONS

U.S. patent application Ser. No. 10/124,745, Grubbs et al., filed Apr. 16, 2002.
Amir–Ebrahimi et al. (2000) "Characteristics of RuCl$_2$(CHPh)(PCy$_3$)$_2$ as a Catalyst for Ring–Opening Metathesis Polymerization," *Macromolecules* 33(3):717–724.
Bielawski et al. (2000), "Highly Efficient Ring–Opening Metathesis Polymerization (ROMP) Using New Ruthenium Catalysts Containing N–Heterocyclic Carbene Ligands," *Angew. Chem. Int. Ed.* 39(16):2903–2906.
Bruzaud et al. (2000), "Synthesis and Characterizationof New Functional Polymers by Polymer–analog Reactions on EVOH Copolymer," *Macromol. Chem. Phys.* 201:1758–1764.
Hamilton et al. (2000), "N–Heterocyclic Carbenes (NHC) in Olefin Metathesis: Influence of the NHC–Ligands on Polymer Tacticity," *Journal of Organometallic Chemistry* 606:8–12.
Hillmyer et al. (1995), "Ring–Opening Metathesis Polymerization of Functionalized Cyclooctenes by a Ruthenium–Based Metathesis Catalyst," *Macromolecules* 28(18):6311–6316.
Juang et al. (2001), "Formation of Covalently Attached Polymer Overlayers on Si(111) Surfaces Using Ring–Opening Metathesis Polymerization Methods," *Langmuir* 17(5):1321–1323.
Ramakrishnan (1991), "Well–Defined Ethylene–Vinyl Alcohol Copolymers via Hydroboration: Control of Composition and Distribution of the Hydroxyl Groups on the Polymer Backbone," *Macromolecules* 24(13):3753–3759.
Ramakrishnan et al. (1990), "Poly(5–hydroxyoctenylene) and Its Derivatives: Synthesis via Metathesis Polymerization of an Organoborane Monomer," *Macromolecules* 23(21):4519–4524.
Sanford et al. (2001), "Mechanism and Activity of Ruthenium Olefin Metathesis Catalysts," *J. Am. Chem. Soc.* 123(27):6543–6554.
Scherman et al. (2002), "Synthesis of Well–Defined Poly((vinyl alcohol)$_2$–alt–methylene) via Ring–Opening Metathesis Polymerization," *Macromolecules* 35(14):5366–5371.
Schellekens et al. (2000), "Synthesis of Polyolefin Block and Graft Copolymers," *J. Mol. Sci.–Rev. Macromol. Chem. Phys.* C40(2&3):167–192.
Valenti et al. (1998), "Direct Synthesis of Well–Defined Alcohol–Functionalized Polymers via Acyclic Diene Metathesis (ADMET) Polymerization," *Macromolecules* 31(9):2764–2773.

*Primary Examiner*—Robert D. Harlan
(74) *Attorney, Agent, or Firm*—Dianne E. Reed; Reed & Eberle LLP

(57) ABSTRACT

A method is provided for synthesizing a polymer in a controlled fashion using a ring-opening metathesis polymerization (ROMP) reaction, wherein polymerization is carried out using a catalytically effective amount of an olefin metathesis catalyst and a bridged bicyclic or polycyclic olefin monomer that contains at least two heteroatoms directly or indirectly linked to each other. Preferred catalysts are Group 8 transition metal complexes, particularly complexes of Ru and Os. Such complexes include the ruthenium bisphosphine complex (PCy$_3$)$_2$(Cl)$_2$Ru=CHPh (1) and the ruthenium carbene complex (IMesH$_2$)(PCy$_3$)(Cl)$_2$Ru=CHPh (2). The invention also provides novel regioregular polymers synthesized using the aforementioned methodology, wherein the polymers may be saturated, unsaturated, protected, and/or telechelic. An exemplary polymer is poly((vinyl alcohol)$_2$-alt-methylene) (MVOH).

61 Claims, 5 Drawing Sheets

U.S. PATENT DOCUMENTS

| | | |
|---|---|---|
| 6,111,121 A | 8/2000 | Grubbs et al. |
| 6,153,778 A | 11/2000 | Grubbs et al. |
| 6,156,692 A | 12/2000 | Nubel et al. |
| 6,211,391 B1 | 4/2001 | Grubbs et al. |
| 6,271,315 B1 | 8/2001 | Kiessling et al. |
| 6,284,852 B1 | 9/2001 | Lynn et al. |
| 6,291,616 B1 | 9/2001 | Kiessling et al. |
| 6,310,121 B1 | 10/2001 | Woodson, Jr et al. |
| 6,313,332 B1 | 11/2001 | Grubbs et al. |
| 6,323,296 B1 | 11/2001 | Warner et al. |
| 6,342,621 B1 | 1/2002 | Mukerjee et al. |
| 6,383,319 B1 | 5/2002 | Humble et al. |
| 6,409,875 B1 | 6/2002 | Giardello et al. |
| 6,414,097 B1 | 7/2002 | Grubbs et al. |
| 6,426,419 B1 | 7/2002 | Grubbs et al. |

RING-OPENING METATHESIS POLYMERIZATION OF BRIDGED BICYCLIC AND POLYCYCLIC OLEFINS CONTAINING TWO OR MORE HETEROATOMS

CROSS-REFERENCE TO RELATED APPLICATIONS

This application claims priority under 35 U.S.C. §119(e)(1) to Provisional U.S. Patent Application Serial No. 60/316,114, filed Aug. 29, 2001. The disclosure of the aforementioned application is incorporated by reference in its entirety.

ACKNOWLEDGEMENT OF GOVERNMENT SUPPORT

The U.S. Government has certain rights in this invention pursuant to Grant No. CHE-9809856 awarded by the National Science Foundation.

TECHNICAL FIELD

This invention relates generally to synthesis of polymers, including regioregular and telechelic polymers, via ring-opening metathesis polymerization (ROMP). More particularly, the invention pertains to synthesis of regioregular polymers via a ROMP reaction using bridged bicyclic and polycyclic olefin monomers and a Group 8 transition metal complex as the metathesis catalyst. The polymers provided herein have utility in a variety of fields, including not only polymer chemistry per se, but also in the pharmaceutical, biomedical, and packaging industries.

BACKGROUND OF THE INVENTION

Interest in making well-defined linear polymers substituted with polar and/or functional groups has been spurred, in part, by the commercial utility of ethylene-vinyl alcohol (EVOH) copolymers. EVOH copolymers, as a class, exhibit excellent barrier properties toward gases and hydrocarbons and have found use in the food packaging, biomedical, and pharmaceutical industries. See Lagaron et al. (2001) *Polym. Testing* 20:569–577, and Ramakrishnan (1991) *Macromolecules* 24:3753–3759. Furthermore, the lack of understanding of the property-structure relationships in these materials has fueled academic interest in the microstructure of EVOH copolymers. See Ramakrishnan (1991), supra; Ramakrishnan (1990) *Macromolecules* 23:4519–4524; Valenti et al. (1998) *Macromolecules* 31:2764–2773; and Bruzaud et al. (2000) *Macromol. Chem. Phys.* 201:1758–1764. The most widely employed synthetic route to EVOH copolymers is the free radical polymerization of ethylene and vinyl acetate, followed by saponification (Ramakrishnan (1990)). These EVOH copolymers contain a degree of branching, much like low-density polyethylene (LDPE), and have a random distribution of alcohol functionality along the polymer backbone ((Ramakrishnan (1991); Valenti et al., supra), both of which limit the elucidation of the structure-property relationships in these materials.

The direct incorporation of polar functional groups along the backbone of linear polymers made via ring-opening metathesis polymerization ("ROMP") is now possible due to the development of functional group-tolerant late transition metal olefin metathesis catalysts. Recently, Hillmyer et al. reported the ROMP of alcohol-, ketone-, halogen-, and acetate-substituted cyclooctenes with a ruthenium olefin metathesis catalyst (Hillmyer et al. (1995) *Macromolecules* 28: 6311–6316). However, the asymmetry of the substituted cyclooctene allowed for head-to-head (HH), head-to-tail (HT), and tail-to-tail (TT) coupling, yielding polymer with regiorandom placement of the functional groups. A similar problem was encountered by Chung et al., who reported the ROMP of a borane-substituted cyclooctene with an early transition metal catalyst followed by oxidation to yield an alcohol functionalized linear polymer (Ramakrishnan et al. (1990), supra). A solution to this regiorandom distribution of functional groups was reported by Valenti et al., who used the acyclic diene metathesis (ADMET) polymerization of an alcohol-containing symmetric diene (Valenti et al., supra; Schellekens et al. (2000) *J. Mol. Sci. Rev. Macromol. Chem. Phys.* C40:167–192)) However, the molecular weights of these polymers were restricted to <3×10$^4$ g/mol by ADMET, and their rich hydrocarbon content limits the barrier properties of the final EVOH copolymers (Lagaron et al., supra).

Transition metal carbene complexes, particularly ruthenium and osmium carbene complexes, have been described as metathesis catalysts in U.S. Pat. Nos. 5,312,940, 5,342,909, 5,831,108, 5,969,170, 6,111,121, and 6,211,391 to Grubbs et al., assigned to the California Institute of Technology. The ruthenium and osmium carbene complexes disclosed in these patents all possess metal centers that are formally in the +2 oxidation state, have an electron count of 16, and are penta-coordinated. Such complexes have been disclosed as useful in catalyzing a variety of olefin metathesis reactions, including ROMP, ring closing metathesis ("RCM"), acyclic diene metathesis polymerization ("ADMET"), ring-opening metathesis ("ROM"), and cross-metathesis ("CM" or "XMET") reactions. Examples of such catalysts are $(PCy_3)_2(Cl)_2Ru=CHPh$ (1) and $(IMesH_2)(PCy_3)(Cl)_2Ru=CHPh$ (2):

1:

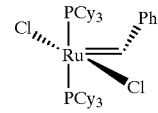

2:

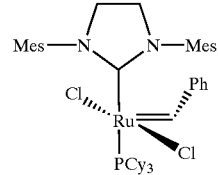

In the above molecular structures, "Mes" represents mesityl (2,4,6-trimethylphenyl), "Ph" is phenyl, and "Cy" is cyclohexyl.

Catalysts (1) and (2) have been shown to afford the ROMP of many substituted cyclic olefins. See, for example, Bielawski et al. (2000) *Angew. Chem., Int. Ed.* 39:2903–2906; Sanford et al. (2001) *J. Am. Chem. Soc.* 123:6543–6554; Amir-Ebrahimi et al. (2000) *Macromolecules* 33:717–724; and Hamilton et al. (2000) *J. Organomet. Chem* 606:8–12. Recent development of ruthenium catalysts, such as (2), coordinated with an N-heterocyclic carbene has allowed for the ROMP of low-strain cyclopentene and substituted cyclopentene. Bielawski et al., supra. The ROMP of a symmetric cyclopentene yields a regioregular polyalkene, as no difference exists between HH, HT, and TT couplings. Hence, the ROMP of alcohol- or acetate-disubstituted cyclopentene monomers was attempted (Scheme 1).

SCHEME 1

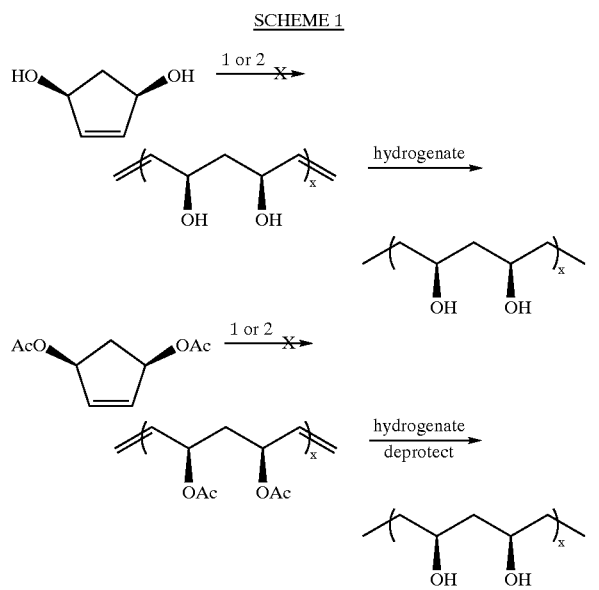

Unfortunately, neither catalyst (1) nor the more active (2) could afford the ROMP of these cyclopentene monomers.

Accordingly, there is a need in the art for a method of synthesizing polymers using catalysts that are tolerant of functional groups and a process that enables precise control over molecular weight, molecular weight distribution, and polydispersity. Ideally, such a method would also be useful in the synthesis of regioregular and/or telechelic polymers. The invention is directed to such a method, and now provides a highly effective polymerization process in which a ROMP reaction is carried out using substituted bridged bicyclic or polycyclic olefin monomers and a transition metal carbene complex such as (1) or (2). The process can be used to synthesize regioregular and/or telechelic polymers, in a manner that enables careful control over polymer properties such as molecular weight and polydispersity.

SUMMARY OF THE INVENTION

The invention is directed, in part, to a method for synthesizing a polymer using a ring-opening metathesis polymerization (ROMP) reaction, wherein the reaction is carried out by contacting a bridged bicyclic or polycyclic olefin monomer with a catalytically effective amount of an olefin metathesis catalyst under reaction conditions effective to allow the ROMP reaction to occur. The bridged bicyclic or polycyclic olefin monomer contains a plurality of heteroatoms, i.e., two or more heteroatoms, with two (or possibly more, if present) heteroatoms directly or indirectly linked to each other. By a "bridged" bicyclic or polycyclic olefin is meant that three carbon atoms in the molecule are ring atoms in two different cyclic structures.

The olefin metathesis catalyst for carrying out the aforementioned polymerization reaction is preferably a Group 8 transition metal complex having the structure of formula (I)

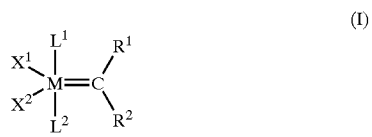

in which:
  M is a Group 8 transition metal;
  $L^1$ and $L^2$ are neutral electron donor ligands;
  $X^1$ and $X^2$ are anionic ligands; and
  $R^1$ and $R^2$ are independently selected from hydrogen, hydrocarbyl, substituted hydrocarbyl, heteroatom-containing hydrocarbyl, substituted heteroatom-containing hydrocarbyl, and functional groups,
    wherein any two or more of $X^1$, $X^2$, $L^1$, $L^2$, $R^1$, and $R^2$ can be taken together to form a cyclic group, and further wherein any one or more of $X^1$, $X^2$, $L^1$, $L^2$, $R^1$, and $R^2$ may be attached to a support.
  Preferred catalysts contain Ru or Os as the Group 8 transition metal, with Ru particularly preferred.

The catalysts having the structure of formula (I) are in one of two groups. In the first group, $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether. Exemplary ligands are trisubstituted phosphines. The first group of catalysts, accordingly, is exemplified by the ruthenium bisphosphine complex $(PCy_3)_2(Cl)_2Ru=CHPh$ (1)

1:

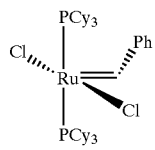

The catalysts of the second group are transition metal carbene complexes, preferably ruthenium carbene complexes, wherein $L^2$ is as defined above and $L^1$ is a carbene having the structure of formula (II)

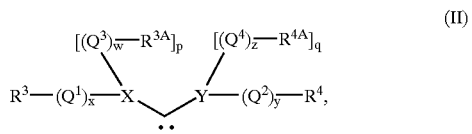

such that the complex has the structure of formula (IIA)

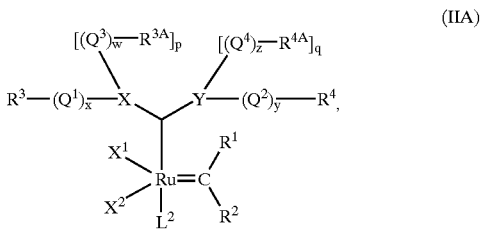

wherein:
  $X^1$, $X^2$, $L^1$, $L^2$, $R^1$, and $R^2$ are as defined above;

X and Y are heteroatoms selected from N, O, S, and P;

p is zero when X is O or S, and p is 1 when X is N or P;

q is zero when Y is O or S, and q is 1 when Y is N or P;

$Q^1$, $Q^2$, $Q^3$, and $Q^4$ are independently selected from hydrocarbylene, substituted hydrocarbylene, heteroatom-containing hydrocarbylene, substituted heteroatom-containing hydrocarbylene, and —(CO)—, and further wherein two or more substituents on adjacent atoms within Q may be linked to form an additional cyclic group;

w, x, y, and z are independently zero or 1; and $R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl, wherein any two or more of $X^1$, $X^2$, $L^2$, $R^1$, $R^2$, $R^3$, $R^{3A}$, $R^4$, and $R^{4A}$ can be taken together to form a cyclic group, and further wherein any one or more of $X^1$, $X^2$, $L^2$, $R^1$, $R^2$, $R^3$, $R^{3A}$, $R^4$, and $R^{4A}$ may be attached to a support.

The second group of catalysts, accordingly, is exemplified by the ruthenium carbene complex $(IMeSH_2)(PCY_3)(Cl)^2Ru\!=\!CHPh$ (2):

2:

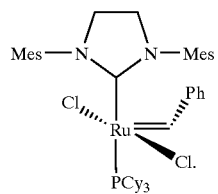

Additional transition metal carbene complexes useful as catalysts in conjunction with the present invention include, but are not limited to, neutral ruthenium or osmium metal carbene complexes containing metal centers that are formally in the +2 oxidation state, have an electron count of 16, are penta-coordinated, and are of the general formula (IIIA). Other preferred metathesis catalysts include, but are not limited to, cationic ruthenium or osmium metal carbene complexes containing metal centers that are formally in the +2 oxidation state, have an electron count of 14, are tetra-coordinated, and are of the general formula (IIIB). Still other preferred metathesis catalysts include, but are not limited to, neutral ruthenium or osmium metal carbene complexes containing metal centers that are formally in the +2 oxidation state, have an electron count of 18, are hexa-coordinated, and are of the general formula III(C).

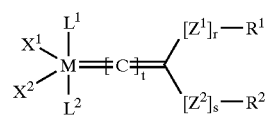

(IIIA)

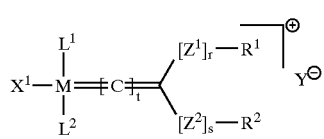

(IIIB)

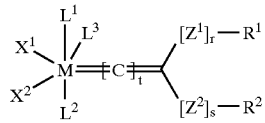

(IIIC)

In the foregoing structures, $X^1$, $X^2$, $L^1$, $L^2$, $R^1$, and $R^2$ are as defined previously, r and s are independently zero or 1, t is an integer in the range of zero to 5, Y is any noncoordinating anion, $Z^1$ and $Z^2$ are independently selected from —O—, —S—, —$NR^2$—, —$PR^2$—, —P(=O)$R^2$—, —P($OR^2$)—, —P(=O)($OR^2$)—, —C(=O)—, —C(=O)O—, —OC(=O)13 , —OC(=O)O—, —S(=O)—, or —S(=O)$_2$—, and any two or more of $X^1$, $X^2$, $L^1$, $L^2$, $Z^1$, $Z^2$, $R^1$, and $R^2$ may be taken together to form a cyclic group, e.g., a multidentate ligand, and wherein any one or more of $X^1$, $X^2$, $L^1$, $L^2$, $Z^1$, $Z^2$, $R^1$, and $R^2$ may be attached to a support.

The bridged bicyclic or polycyclic olefin monomer has the structure of formula (VII)

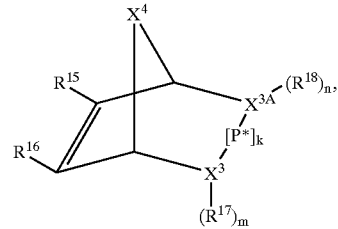

(VII)

wherein:

$X^3$ and $X^{3A}$ are heteroatoms selected from O, N, and S;

$X^4$ is a one-atom or two-atom linkage (with a "one-atom" linkage referring to a linkage that provides a single, optionally substituted spacer atom between the two adjacent carbon atoms, and a "two-carbon" linkage, similarly, referring to a linkage that provides two optionally substituted spacer atoms between the two adjacent carbon atoms);

k is zero when one or both of $X^3$ or $X^{3A}$ are N, and k is 1 when neither $X^3$ or $X^{3A}$ is N;

m is zero when $X^3$ is O or S, and m is 1 when $X^3$ is N;

n is zero when $X^{3A}$ is O or S, and n is 1 when $X^{3A}$ is N;

one of $R^{15}$ and $R^{16}$ is hydrogen and the other is selected from hydrogen, hydrocarbyl (e.g., $C_1$–$C_{20}$ alkyl, $C_2$–$C_{20}$ alkenyl, $C_2$–$C_{20}$ alkynyl, $C_5$–$C_{20}$ aryl, $C_6$–$C_{24}$ alkaryl and $C_6$–$C_{24}$ aralkyl), substituted hydrocarbyl (e.g., substituted $C_1$–$C_{20}$ alkyl, $C_2$–$C_{20}$ alkenyl, $C_2$–$C_{20}$ alkynyl, $C_5$–$C_{20}$ aryl, $C_6$–$C_{24}$ alkaryl, and $C_6$–$C_{24}$ aralkyl), heteroatom-containing hydrocarbyl (e.g., heteroatom-containing $C_1$–$C_{20}$ alkyl, $C_2$–$C_{20}$ alkenyl, $C_2$–$C_{20}$ alkynyl, $C_5$–$C_{20}$ aryl, $C_6$–$C_{24}$ alkaryl, and $C_6$–$C_{24}$ aralkyl), substituted heteroatom-containing hydrocarbyl (e.g., substituted heteroatom-containing $C_1$–$C_{20}$ alkyl, $C_2$–$C_{20}$ alkenyl, $C_2$–$C_{20}$ alkynyl, $C_5$–$C_{20}$ aryl, $C_6$–$C_{24}$ alkaryl, and $C_6$–$C_{24}$ aralkyl), and —(L)$_v$—Fn wherein v is zero or 1, L is hydrocarbylene, substituted hydrocarbylene and/or heteroatom-containing hydrocarbylene, and Fn is a functional group;

P* is a protecting group that is inert under polymerization conditions but removable from the synthesized polymer; and $R^{17}$ and $R^{18}$ are independently selected from hydrogen, hydrocarbyl, substituted hydrocarbyl, heteroatom-containing hydrocarbyl, substituted heteroatom-containing hydrocarbyl, and amino protecting groups, wherein $R^{17}$ and $R^{18}$ may be taken together to form a cyclic group.

The ROMP reaction results in protected, unsaturated regioregular polymers when $X^4$ is a single atom linkage, e.g., a methylene group, and when $-X^3(R^{17})_m$ is identical to $-X^{3A}(R^{18})_n$. These unsaturated regioregular polymers can be hydrogenated to give the corresponding saturated polymers, which are then deprotected to yield the final polymeric product. As an example, starting with monomers wherein $X^3$ and $X^{3A}$ are O, $X^4$ is methylene, and $R^{15}$ and $R^{16}$ are hydrogen, the polymer synthesized via ROMP is an unsaturated, protected analog of poly((vinyl alcohol)$_2$-alt-methylene)(MVOH), which can then be hydrogenated and deprotected to give MVOH per se (see Examples 1, 3 and 4).

In another embodiment, the reaction is carried out in the presence of a chain transfer agent, i.e., an α,ω-difunctional olefin, so as to provide a telechelic polymer. If the initial bicyclic or polycyclic olefin monomer contains a single atom linkage at $X^4$, and $-X^3(R^{17})_m$ is identical to $-X^{3A}(R^{18})_n$, as above, the telechelic polymer is regioregular.

The invention also provides, as novel compositions of matter, regioregular polymers that are synthesized using the methodology of the invention. The polymers are saturated or unsaturated, and, in a first embodiment, are comprised of recurring units having the structure of formula (XV)

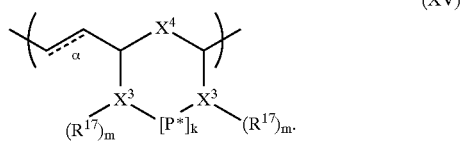

(XV)

wherein:
  m, k, $X^3$, $R^{17}$, and P* are as defined with respect to the cyclic olefin monomers of formula (VII);
  α is an optional double bond; and
  $X^4$ is a single-atom linkage having the structure $CR^{19}R^{20}$ wherein $R^{19}$ and $R^{20}$ are independently selected from hydrogen, substituted hydrocarbyl, heteroatom-containing hydrocarbyl, substituted heteroatom-containing hydrocarbyl, and functional groups;

The polymer may be telechelic, in which case the polymer terminates in two functional groups that enable further reaction.

In another embodiment, the polymers are comprised of recurring units having the structure of formula (X)

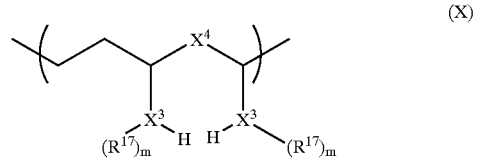

(X)

wherein $X^3$, $X^4$, $R^{17}$, and m are defined as for formula (XV), and further wherein the polymer may be telechelic and terminate in two functional groups, as described above with respect to polymers of formula (XV).

The invention represents a substantial improvement relative to prior synthetic methods that have been used to prepare ethylene-(vinyl alcohol) (EVOH) and analogous polymers and copolymers having pendant heteroatom-containing functional groups. That is, prior methods for synthesizing such polymers resulted in random distribution of hydroxyl groups or other functionalities along the polymer backbone, limiting the utility of the polymers prepared. Earlier routes to polymers within the aforementioned class also resulted in branched and/or relatively low molecular weight polymers (less than about 30,000). See, e.g., Ramakrishnan (1990), Ramakrishnan (1991), Valenti et al. (1998), Lagaron et al. (2001), and Schellekens et al. (2000) J. Mol. Sci. Rev. Macromol. Chem. Phys. C40:167–192. By contrast, the present methodology allows for polymer synthesis to take place in a controlled fashion over a large molecular weight range, such that the molecular weight, molecular weight distribution, polydispersity index (PDI), and linearity of the resulting polymer product can be controlled. In addition, completely regioregular polymers can be prepared by using a symmetric bicyclic or polycyclic olefin as the monomeric substrate for the ROMP reaction.

BRIEF DESCRIPTION OF THE FIGURES

FIGS. 1A and 1C are the $^{13}$C NMR and $^1$H NMR spectra, respectively, of polymer (4), synthesized as described in Example 1. FIGS. 1B and 1D are the $^{13}$C NMR and $^1$H NMR spectra, respectively, of polymer (7), prepared by hydrogenation of polymer (4), as described in Example 3.

DETAILED DESCRIPTION OF THE INVENTION

I. Definitions and Nomenclature

Figures 1A, 1B:
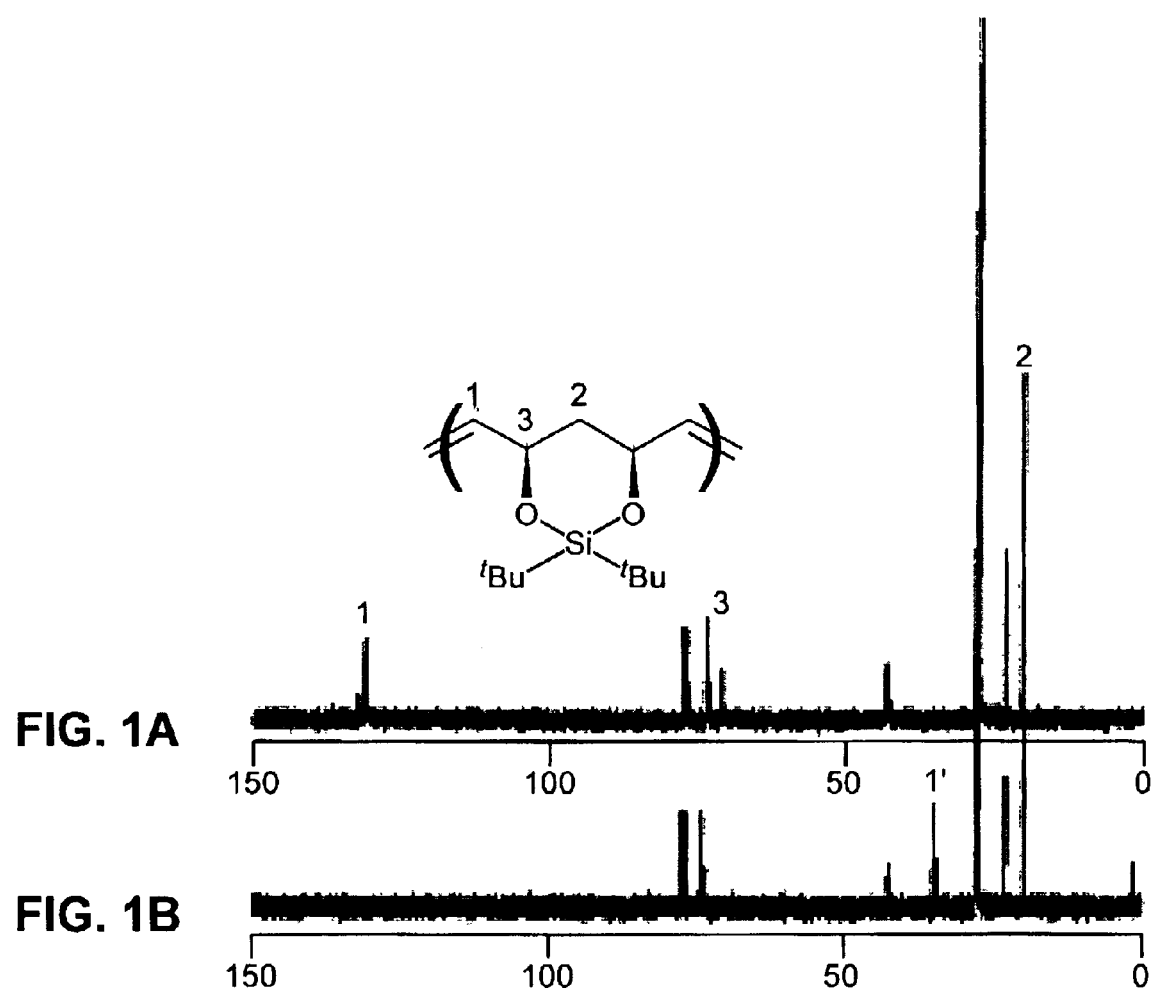
FIGS. 1A–1D are NMR spectra of regioregular polymers prepared according to the method of the invention.

It is to be understood that unless otherwise indicated this invention is not limited to specific reactants, reaction conditions, ligands, metal complexes, or the like, as such may vary. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Thus, for example, reference to "a compound" encompasses a combination or mixture of different compounds as well as a single compound, reference to "a substituent" includes a single substituent as well as two or more substituent groups that may or may not be the same, and the like.

In this specification and in the claims that follow, reference will be made to a number of terms, which shall be defined to have the following meanings:

As used herein, the phrase "having the formula" or "having the structure" is not intended to be limiting and is used in the same way that the term "comprising" is commonly used.

The term "alkyl" as used herein refers to a linear, branched, or cyclic saturated hydrocarbon group typically although not necessarily containing 1 to about 20 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of 1 to 6 carbon atoms, and the specific term "cycloalkyl" intends a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 20 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" intends an alkenyl group of 2 to 6 carbon atoms, and the specific term "cycloalkenyl" intends a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 20 carbon atoms containing at least one triple bond, such as ethynyl, n-propynyl, and the like. Preferred alkynyl groups herein contain 2 to about 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms, and includes, for example, methoxy, ethoxy, n-propoxy, isopropoxy, t-butyloxy, etc. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 20 carbon atoms and either one aromatic ring or 2 to 4 fused or linked aromatic rings, e.g., phenyl, naphthyl, biphenyl, and the like, with more preferred aryl groups containing 1 to 3 aromatic rings, and particularly preferred aryl groups containing 1 or 2 aromatic rings and 5 to 14 carbon atoms. "Substituted aryl" refers to an aryl moiety substituted with one or more substituent groups, and the terms "heteroatom-containing aryl" and "heteroaryl" refer to aryl in which at least one carbon atom is replaced with a heteroatom. Unless otherwise indicated, the terms "aromatic," "aryl," and "arylene" include heteroaromatic, substituted aromatic, and substituted heteroaromatic species.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 20 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred aralkyl groups contain 6 to 24 carbon atoms, and particularly preferred aralkyl groups contain 6 to 16 carbon atoms. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-dienyl, and the like.

The terms "halo," "halide," and "halogen" are used in the conventional sense to refer to a chloro, bromo, fluoro, or iodo substituent. The terms "haloalkyl," "haloalkenyl," and "haloalkynyl" (or "halogenated alkyl," "halogenated alkenyl," and "halogenated alkynyl") refer to an alkyl, alkenyl, or alkynyl group, respectively, in which at least one of the hydrogen atoms in the group has been replaced with a halogen atom.

"Hydrocarbyl" refers to univalent hydrocarbyl radicals containing 1 to about 30 carbon atoms, preferably 1 to about 20 carbon atoms, more preferably 1 to about 12 carbon atoms, including linear, branched, cyclic, saturated, and unsaturated species, such as alkyl groups, alkenyl groups, aryl groups, and the like. The term "lower hydrocarbyl" intends a hydrocarbyl group of 1 to 6 carbon atoms, and the term "hydrocarbylene" intends a divalent hydrocarbyl moiety containing 1 to about 30 carbon atoms, preferably 1 to about 20 carbon atoms, most preferably 1 to about 12 carbon atoms, including linear, branched, cyclic, saturated and unsaturated species. The term "lower hydrocarbylene" intends a hydrocarbylene group of 1 to 6 carbon atoms. Unless otherwise indicated, the terms "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing alkyl group" (also termed a "heteroalkyl" group)

or a "heteroatom-containing aryl group" (also termed a "heteroaryl" group) refers to a molecule, linkage, or substituent in which one or more carbon atoms are replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc. It should be noted that a "heterocyclic" group or compound may or may not be aromatic, and further that "heterocycles" may be monocyclic, bicyclic, or polycyclic as described above with respect to the term "aryl."

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with a non-hydrogen substituent. Examples of such substituents include, without limitation, functional groups such as halide, hydroxyl, sulfhydryl, $C_1$–$C_{20}$ alkoxy, $C_2$–$C_{20}$ alkenyloxy, $C_2$–$C_{20}$ alkynyloxy, $C_5$–$C_{20}$ aryloxy, $C_2$–$C_{20}$ acyl (including $C_2$–$C_{20}$ alkylcarbonyl (—CO-alkyl) and $C_6$–$C_{20}$ arylcarbonyl (—CO-aryl)), acyloxy (—O-acyl), $C_2$–$C_{20}$ alkoxycarbonyl (—(CO)—O-alkyl), $C_6$–$C_{20}$ aryloxycarbonyl (—(CO)—O-aryl), halocarbonyl (—CO)—X where X is halo), $C_2$–$C_{20}$ alkyl-carbonato (—O—(CO)—O-alkyl), $C_6$–$C_{20}$ arylcarbonato (—O—(CO)—O-aryl), carboxy (—COOH), carboxylato (—COO—), carbamoyl (—(CO)—$NH_2$), mono-($C_1$–$C_{20}$ alkyl)-substituted carbamoyl (—(CO)—NH($C_1$–$C_{20}$ alkyl)), di-($C_1$–$C_{20}$ alkyl)-substituted carbamoyl (—(CO)—N($C_1$–$C_{20}$ alkyl)$_2$), mono-substituted arylcarbamoyl (—(CO)—NH-aryl), thiocarbamoyl (—(CS)—$NH_2$), carbamido (—NH—(CO)—$NH_2$), cyano(—C≡N), cyanato (—O—C≡N), formyl (—(CO)—H), thioformyl (—(CS)—H), amino (—$NH_2$), mono- and di-($C_1$–$C_{20}$ alkyl)-substituted amino, mono- and di-($C_5$–$C_{20}$ aryl)-substituted amino, $C_2$–$C_{20}$ alkylamido (—NH—(CO)-alkyl), $C_6$–$C_{20}$ arylamido (—NH—(CO)-aryl), imino (—CR=NH where R=hydrogen, $C_1$–$C_{20}$ alkyl, $C_5$–$C_{20}$ aryl, $C_6$–$C_{24}$ alkaryl, $C_6$–$C_{24}$ aralkyl, etc.), alkylimino (—CR=N(alkyl), where R=hydrogen, alkyl, aryl, alkaryl, etc.), arylimino (—CR=N(aryl), where R=hydrogen, alkyl, aryl, alkaryl, etc.), nitro (—$NO_2$), nitroso (—NO), sulfo (—$SO_2$—OH), sulfonato (—$SO_2$—O—), $C_1$–$C_{20}$ alkylsulfanyl (—S-alkyl; also termed "alkylthio"), arylsulfanyl (—S-aryl; also termed "arylthio"), $C_1$–$C_{20}$ alkylsulfinyl (—(SO)-alkyl), $C_5$–$C_{20}$ arylsulfinyl (—(SO)-aryl), $C_1$–$C_{20}$ alkylsulfonyl (—$SO_2$-alkyl), $C_5$–$C_{20}$ arylsulfonyl (—$SO_2$-aryl), thiocarbonyl (=S), boryl (—$BH_2$), borono (—$B(OH)_2$), boronato (—$B(OR)_2$ where R is alkyl or other hydrocarbyl), phospho (—$PO_2$), phosphino (—$PH_2$), silyl (—$SiR_3$ wherein R is hydrogen or hydrocarbyl), silyloxy (—O-silyl), silanyl (—NR-silyl, where R is hydrogen or hydrocarbyl), stannyl, or germyl; and the hydrocarbyl moieties $C_1$–$C_{20}$ alkyl (preferably $C_1$–$C_{18}$ alkyl, more preferably $C_1$–$C_{12}$ alkyl, most preferably $C_1$–$C_6$ alkyl), $C_2$–$C_{20}$ alkenyl (preferably $C_2$–$C_{18}$ alkenyl, more preferably $C_2$–$C_{12}$ alkenyl, most preferably $C_2$–$C_6$ alkenyl), $C_2$–$C_{20}$ alkynyl (preferably $C_2$–$C_{18}$ alkynyl, more preferably $C_2$–$C_{12}$ alkynyl, most preferably $C_2$–$C_6$ alkynyl), $C_5$–$C_{20}$ aryl (preferably $C_5$–$C_{14}$ aryl), $C_6$–$C_{24}$ alkaryl (preferably $C_6$–$C_{18}$ alkaryl), and $C_6$–$C_{24}$ aralkyl (preferably $C_6$–$C_{18}$ aralkyl).

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Analogously, the term "optionally substituted alkyl, alkenyl and alkynyl" is to be interpreted as "optionally substituted alkyl, optionally substituted alkenyl and optionally substituted alkynyl," and a "bridged bicyclic or polycyclic olefin monomer" is to be interpreted as a "bridged bicyclic olefin monomer" or a "bridged polycyclic olefin monomer."

The term "regioregular polymer" is used to refer to a polymer with a regular arrangement of the "connectivity" between the monomer units.

The term "telechelic" is used in the conventional sense to refer to a macromolecule, e.g., a polymer, that is capped by at least one reactive end group. Preferred telechelic compounds herein are regioregular polymers having two terminal functional groups each capable of undergoing further reaction.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

In the molecular structures herein, the use of bold and dashed lines to denote particular conformation of groups follows the IUPAC convention. A bond indicated by a broken line indicates that the group in question is below the general plane of the molecule as drawn (the "α" configuration), and a bond indicated by a bold line indicates that the group at the position in question is above the general plane of the molecule as drawn (the "β" configuration).

II. Catalysts

The ring-opening metathesis polymerization reactions of the invention are carried out catalytically, using a Group 8 transition metal complex as the catalyst. These transition metal carbene complexes include a metal center in a +2 oxidation state, have an electron count of 16, and are penta-coordinated. The complexes are represented by the structure of formula (I)

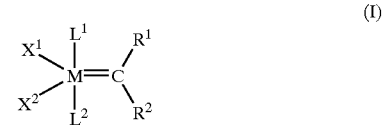

(I)

wherein the various substituents are as follows:

M, which serves as the transition metal center in the +2 oxidation state, is a Group 8 transition metal, particularly ruthenium or osmium. In a particularly preferred embodiment, M is ruthenium.

$X^1$ and $X^2$ are anionic ligands, and may be the same or different, or are linked together to form a cyclic group, typically although not necessarily a five-to eight-membered ring. In preferred embodiments, $X^1$ and $X^2$ are each independently hydrogen, halide, or one of the following groups: $C_1$–$C_{20}$ alkyl, $C_5$–$C_{20}$ aryl, $C_1$–$C_{20}$ alkoxy, $C_5$–$C_{20}$ aryloxy, $C_2$–$C_{20}$ alkoxycarbonyl, $C_6$–$C_{20}$ aryloxycarbonyl, $C_2$–$C_{20}$ acyl, $C_2$–$C_{20}$ acyloxy, $C_1$–$C_{20}$ alkylsulfonato, $C_5$–$C_{20}$ arylsulfonato, $C_1$–$C_{20}$ alkylsulfanyl, $C_5$–$C_{20}$ arylsulfanyl, $C_1$–$C_{20}$ alkylsulfinyl, or $C_5$–$C_{20}$ arylsulfinyl. Optionally, $X^1$ and $X^2$ may be substituted with one or more moieties selected from $C_1$–$C_{12}$ alkyl, $C_1$–$C_{12}$ alkoxy, $C_5$–$C_{20}$ aryl, and halide, which may, in turn, with the exception of halide, be further substituted with one or more groups selected from halide, $C_1$–$C_6$ alkyl, $C_1$–$C_6$ alkoxy, and phenyl. In more preferred embodiments, $X^1$ and $X^2$ are halide, benzoate, $C_2$–$C_6$ acyl, $C_2$–$C_6$ alkoxycarbonyl, $C_1$–$C_6$ alkyl, phenoxy, $C_1$–$C_6$ alkoxy, $C_1$–$C_6$ alkylsulfanyl, aryl, or $C_1$–$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethane-sulfonate. In the most preferred embodiments, $X^1$ and $X^2$ are each chloride.

$R^1$ and $R^2$ are independently selected from hydrogen, hydrocarbyl (e.g., $C_1$–$C_{20}$ alkyl, $C_2$–$C_{20}$ alkenyl, $C_2$–$C_{20}$ alkynyl, $C_5$–$C_{20}$ aryl, $C_6$–$C_{24}$ alkaryl, $C_6$–$C_{24}$ aralkyl, etc.) substituted hydrocarbyl (e.g., substituted $C_1$–$C_{20}$ alkyl, $C_2$–$C_{20}$ alkenyl, $C_2$–$C_{20}$ alkynyl, $C_5$–$C_{20}$ aryl, $C_6$–$C_{24}$ alkaryl, $C_6$–$C_{24}$ aralkyl, etc.), heteroatom-containing hydrocarbyl (e.g., heteroatom-containing $C_1$–$C_{20}$ alkyl, $C_2$–$C_{20}$ alkenyl, $C_2$–$C_{20}$ alkynyl, $C_5$–$C_{20}$ aryl, $C_6$–$C_{24}$ alkaryl, $C_6$–$C_{24}$ aralkyl, etc.) and substituted heteroatom-containing hydrocarbyl (e.g., substituted heteroatom-containing $C_1$–$C_{20}$ alkyl, $C_2$–$C_{20}$ alkenyl, $C_2$–$C_{20}$ alkynyl, $C_5$–$C_{20}$ aryl, $C_6$–$C_{24}$ alkaryl, $C_6$–$C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5 to 8, ring atoms. $R^1$ and $R^2$ may also together form a vinylidene moiety or an analog thereof, as discussed infra with respect to catalysts having the structure of formula (IIIA).

In preferred catalysts, the $R^1$ substituent is hydrogen and the $R^2$ substituent is selected from $C_1$–$C_{20}$ alkyl, $C_2$–$C_{20}$ alkenyl, and $C_5$–$C_{20}$ aryl. More preferably, $R^2$ is phenyl, vinyl, methyl, isopropyl, or t-butyl, optionally substituted with one or more moieties selected from $C_1$–$C_6$ alkyl, $C_1$–$C_6$ alkoxy, phenyl, and a functional group Fn as defined in part (I) of this section. Still more preferably, $R^2$ is phenyl or vinyl substituted with one or more moieties selected from methyl, ethyl, chloro, bromo, iodo, fluoro, nitro, dimethylamino, methyl, methoxy, and phenyl. In the most preferred embodiments, the $R^2$ substituent is phenyl or —C=C(CH$_3$)$_2$.

$L^1$ and $L^2$ are neutral electron donor ligands. $L^1$ may or may not be linked to $R^1$, and $L^2$ may or may not be linked to $R^2$. Examples of suitable $L^2$ moieties include, without limitation, phosphine, sulfonated phosphine, phosphite, phosphinite, phosphonite, arsine, stibine, ether (including cyclic ethers), amine, amide, imine, sulfoxide, carboxyl, nitrosyl, pyridine, substituted pyridine (e.g., halogenated pyridine), imidazole, substituted imidazole (e.g., halogenated imidazole), pyrazine (e.g., substituted pyrazine), and thioether. In more preferred embodiments, $L^2$ is a phosphine of the formula PR$^5$R$^6$R$^7$, where $R^5$, $R^6$, and $R^7$ are each independently aryl or $C_1$–$C_{10}$ alkyl, particularly primary alkyl, secondary alkyl, or cycloalkyl. In the most preferred embodiments, $L^1$ is tricyclohexylphosphine, tricyclopentylphosphine, triisopropylphosphine, triphenylphosphine, diphenylmethylphosphine, or phenyldimethylphosphine, with tricyclohexylphosphine and tricyclopentylphosphine particularly preferred.

It should be emphasized that any two or more (typically two, three, or four) of $X^1$, $X^2$, $L^1$, $L^2$, $R^1$, and $R^2$ can be taken together to form a cyclic group, as disclosed, for example, in U.S. Pat. No. 5,312,940 to Grubbs et al. When any of $X^1$, $X^2$, $L^1$, $L^2$, $R^1$, and $R^2$ are linked to form cyclic groups, those cyclic groups may be five- or six-membered rings, or may comprise two or three five- or six-membered rings, which may be either fused or linked. The cyclic groups may be aliphatic or aromatic, and may be heteroatom-containing and/or substituted, as explained in part (I) of this section.

The cyclic group may, in some cases, form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$—, —As(Ph)$_2$CH$_2$CH$_2$As(Ph$_2$)—, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$CH$_2$CH$_2$P(Ph)$_2$— and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, $L^2$, $R^1$, and $R^2$ (e.g., $X^1$, $L^1$, and $L^2$) are taken together to be cyclopentadienyl, indenyl, or fluorenyl, each optionally substituted with $C_2$–$C_{20}$ alkenyl, $C_2$–$C_{20}$ alkynyl, $C_1$–$C_{20}$ alkyl, $C_5$–$C_{20}$ aryl, $C_1$–$C_{20}$ alkoxy, $C_2$–$C_{20}$ alkenyloxy, $C_2$–$C_{20}$ alkynyloxy, $C_5$–$C_{20}$ aryloxy, $C_2$–$C_{20}$ alkoxycarbonyl, $C_1$–$C_{20}$ alkylthio, $C_1$–$C_{20}$ alkylsulfonyl, or $C_1$–$C_{20}$ alkylsulfinyl, each of which may be further substituted with $C_1$–$C_6$ alkyl, halide, $C_1$–$C_6$ alkoxy or with a phenyl group optionally substituted with halide, $C_1$–$C_6$ alkyl, or $C_1$–$C_6$ alkoxy. More preferably, in compounds of this type, X, $L^1$, and $L^2$ are taken together to be cyclopentadienyl or indenyl, each optionally substituted with vinyl, $C_1$–$C_{10}$ alkyl, $C_5$–$C_{20}$ aryl, $C_1$–$C_{10}$ carboxylate, $C_2$–$C_{10}$ alkoxycarbonyl, $C_1$–$C_{10}$ alkoxy, or $C_5$–$C_{20}$ aryloxy, each optionally substituted with $C_1$–$C_6$ alkyl, halide, $C_1$–$C_6$ alkoxy or with a phenyl group optionally substituted with halide, $C_1$–$C_6$ alkyl or $C_1$–$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to $O_2C(CH_2)_2P(Ph)(CH_2)_2P(Ph)(CH_2)_2CO_2$, phthalocyanines, and porphyrins.

Complexes wherein $L^2$ and $R^2$ are linked, for example, include the following:

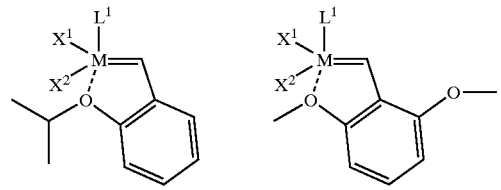

-continued

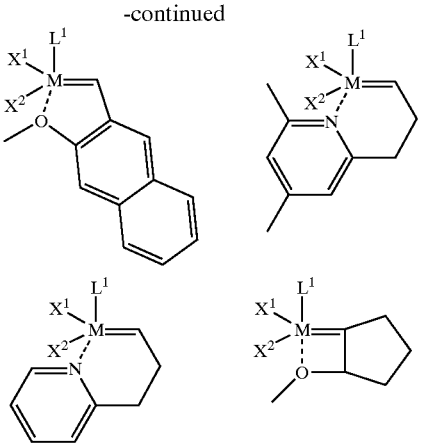

In a first group of catalysts, $L^1$ is as defined for $L^2$, and, in this embodiment, $L^1$ and $L^2$ will generally, although not necessarily, be the same. In these catalysts, $L^1$ and $L^2$ are typically phosphines of the formula $PR^5R^6R^7$, where $R^5$, $R^6$, and $R^7$ are as defined earlier herein. As above, the most preferred $L^1$ and $L^2$ ligands, in this first catalyst group, are selected from tricyclohexylphosphine, tricyclopentylphosphine, triisopropylphosphine, triphenylphosphine, diphenylmethylphosphine, and phenyldimethylphosphine, with tricyclohexylphosphine and tricyclopentylphosphine particularly preferred. These catalysts are, accordingly, exemplified by ruthenium bisphosphine complexes such as $(PCy_3)_2(Cl)_2Ru=CHPh$ (1).

In a second group of catalysts, the complexes are ruthenium carbene complexes, wherein $L^1$ has the structure of formula (II)

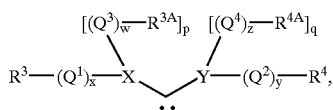

(II)

such that the complexes have the structure of formula (IIA)

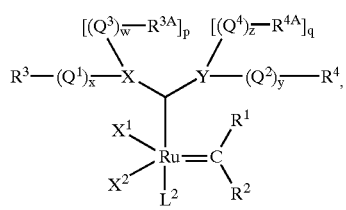

(IIA)

wherein the substituents are as follows:

X and Y are heteroatoms typically selected from N, O, S, and P. Since O and S are divalent, p is necessarily zero when X is O or S, and q is necessarily zero when Y is O or S. However, when X is N or P, then p is 1, and when Y is N or P, then q is 1. In a preferred embodiment, both X and Y are N.

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within Q may be linked to form an additional cyclic group.

$R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl.

In addition, any two or more of $X^1$, $X^2$, $L^2$, $R^1$, $R^2$, $R^3$, $R^{3A}$, $R^4$, and $R^{4A}$ can be taken together to form a cyclic group, and any one or more of $X^1$, $X^2$, $L^2$, $R^1$, $R^2$, $R^3$, $R^{3A}$, $R^4$, and $R^{4A}$ may be attached to a support, as explained above with respect to complexes of formula (I).

Preferably, $R^{3A}$ and $R^{4A}$ are linked to form a cyclic group, such that the complexes of this embodiment have the structure of formula (IV)

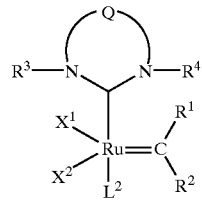

(IV)

wherein $R^3$ and $R^4$ are defined above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to five cyclic groups. Q is often, although again not necessarily, a two-atom linkage or a three-atom linkage, e.g., —$CH_2$—$CH_2$—, —CH(Ph)—CH(Ph)— where Ph is phenyl; =CR—N=, giving rise to an unsubstituted (when R=H) or substituted (R=other than H) triazolyl group; and —$CH_2$—$SiR_2$—$CH_2$— (where R is H, alkyl, alkoxy, etc.).

In a more preferred embodiment, Q is a two-atom linkage having the structure —$CR^8R^9$—$CR^{10}R^{11}$— or —$CR^8=CR^{10}$—, preferably —$CR^8R^9$—$CR^{10}R^{11}$—, in which case the complex has the structure of formula (V)

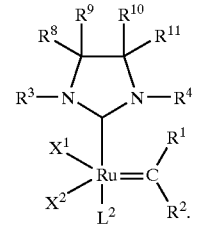

(V)

wherein $R^8$, $R^9$, $R^{10}$, and $R^{11}$ are independently selected from hydrogen, hydrocarbyl, substituted hydrocarbyl, heteroatom-containing hydrocarbyl, substituted heteroatom-containing hydrocarbyl, and functional groups as defined in part (I) of this section. Examples of functional groups here include carboxyl, $C_1$–$C_{20}$ alkoxy, $C_5$–$C_{20}$ aryloxy, $C_2$–$C_{20}$ alkoxycarbonyl, $C_2$–$C_{20}$ alkoxycarbonyl, $C_2$–$C_{20}$ acyloxy, $C_1$–$C_{20}$ alkylthio, $C_5$–$C_{20}$ arylthio, $C_1$–$C_{20}$ alkylsulfonyl, and $C_1$–$C_{20}$ alkylsulfinyl, optionally substituted with one or more moieties selected from $C_1–C_{10}$ alkyl, $C_1–C_{10}$ alkoxy, $C_5–C_{20}$ aryl, hydroxyl, sulfhydryl, formyl, and halide. Alternatively, any two of $R^8$, $R^9$, $R^{10}$, and $R^{11}$ may be linked together to form a substituted or unsubstituted, saturated or unsaturated ring structure, e.g., a $C_4–C_{12}$ alicyclic group or a $C_5$ or $C_6$ aryl group, which may itself be substituted, e.g., with linked or fused alicyclic or aromatic groups, or with other substituents.

When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and have the structure (VI)

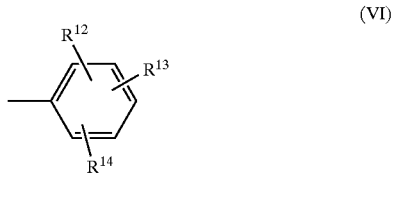

(VI)

in which $R^{12}$, $R^{13}$, and $R^{14}$ are each independently hydrogen, $C_1–C_{20}$ alkyl, substituted $C_1–C_{20}$ alkyl, $C_1–C_{20}$ heteroalkyl, substituted $C_1–C_{20}$ heteroalkyl, $C_5–C_{20}$ aryl, substituted $C_5–C_{20}$ aryl, $C_5–C_{20}$ heteroaryl, $C_5–C_{30}$ aralkyl, $C_5–C_{30}$ alkaryl, or halide. Preferably, $R^{12}$, $R^{13}$, and $R^{14}$ are each independently hydrogen, $C_1–C_{10}$ alkyl, $C_1–C_{10}$ alkoxy, $C_5–C_{14}$ aryl, substituted $C_5–C_{14}$ aryl, or halide. More preferably, $R^3$ and $R^4$ are mesityl, diisopinocamphenyl, or 2,4,2',6'-tetramethylbiphenylyl, and most preferably, $R^3$ and $R^4$ are mesityl.

Examples of such catalysts include, but are not limited to, the following:

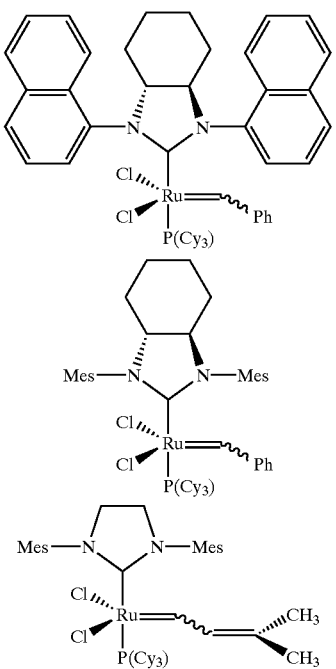

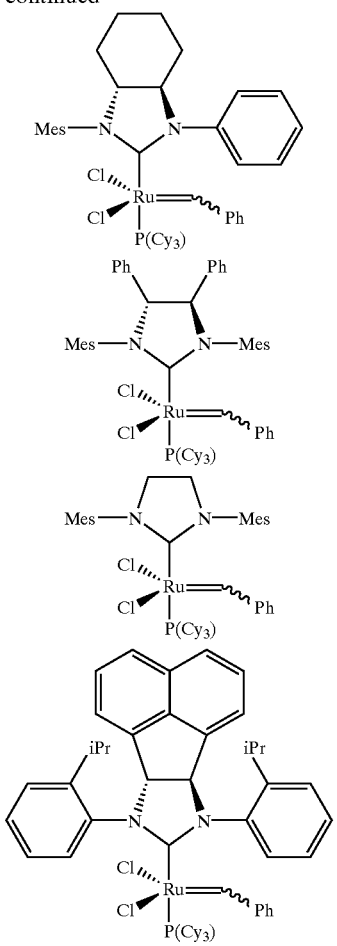

In the foregoing molecular structures, "Mes" represents mesityl (2,4,6-trimethylphenyl), "iPr" is isopropyl, "Ph" is phenyl, and "Cy" is cyclohexyl.

Additional transition metal carbene complexes include, but are not limited to:

neutral ruthenium or osmium metal carbene complexes containing metal centers that are formally in the +2 oxidation state, have an electron count of 16, are penta-coordinated, and are of the general formula (IIIA);

cationic ruthenium or osmium metal carbene complexes containing metal centers that are formally in the +2 oxidation state, have an electron count of 14, are tetra-coordinated, and are of the general formula (IIIB); and neutral ruthenium or osmium metal carbene complexes containing metal centers that are formally in the +2 oxidation state, have an electron count of 18, are hexa-coordinated, and are of the general formula III(C)

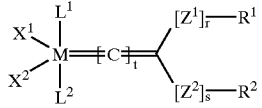

(IIIA)

-continued (IIIB)

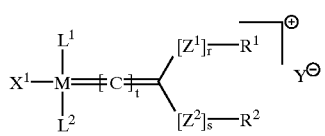

(IIIC)

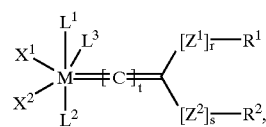

wherein $X^1$, $X^2$, $L^1$, $L^2$, $R^1$, and $R^2$ are as defined previously, r and s are independently zero or 1, t is an integer in the range of zero to 5, Y is any noncoordinating anion (e.g., a halide ion), $Z^1$ and $Z^2$ are independently selected from —O—, —S—, —NR$^2$—, —PR$^2$—, —P(=O)R$^2$—, —P(OR$^2$)—, —P(=O)(OR$^2$)—, —C(=O)—, —C(=O) O—, —OC(=O)—, —OC(=O)O—, —S(=O)—, or —S(=O)$_2$—, and any two or more of $X^1$, $X^2$, $L^1$, $L^2$, $Z^1$, $Z^2$, $R^1$, and $R^2$ may be taken together to form a cyclic group, e.g., a multidentate ligand, and wherein any one or more of $X^1$, $X^2$, $L^1$, $L^2$, $Z^1$, $Z^2$, $R^1$, and $R^2$ may be attached to a support. As understood in the field of catalysis, suitable solid supports may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect, if indirect, typically through a functional group on a support surface.

The transition metal complexes used as catalysts herein can be prepared by several different methods, such as those described by Schwab et al. (1996) J. Am. Chem. Soc. 118:100–110, Scholl et al. (1999) Org. Lett. 6:953–956, Sanford et al. (2001) J. Am. Chem. Soc. 123:749–750, U.S. Pat. Nos. 5,312,940 and 5,342,909. Also see U.S. patent application Ser. No. 10/115,581 to Grubbs, Morgan, Benitez, and Louie, filed Apr. 2, 2002, for "One-Pot Synthesis of Group 8 Transition Metal Carbene Complexes Useful as Olefin Metathesis Catalysts," commonly assigned herewith to the California Institute of Technology.

The transition metal complexes used as catalysts herein, particularly the ruthenium carbene complexes, have a well-defined ligand environment that enables flexibility in modifing and fine-tuning the activity level, stability, solubility and ease of recovery of these catalysts. See, e.g., U.S. Pat. No. 5,849,851 to Grubbs et al. In addition, the solubility of the carbene complexes may be controlled by proper selection of either hydrophobic or hydrophilic ligands, as is well known in the art. The desired solubility of the catalyst will largely be determined by the solubility of the reaction substrates and reaction products. It is well known in the art to design catalysts whose solubility is distinguishable from that of the reaction substrates and products, thereby facilitating recovery of the catalyst from the reaction mixture.

III. Synthesis of Polymers via Romp

In one embodiment, the invention is directed to a method for synthesizing a polymer using a ring-opening metathesis polymerization (ROMP) reaction, comprising contacting a bridged bicyclic or polycyclic olefin monomer with a catalytically effective amount of an olefin metathesis catalyst under reaction conditions effective to allow the ROMP reaction to occur, wherein the olefin monomer contains a plurality of heteroatoms, at least two of which are directly or indirectly linked to each other. By "directly" linked is meant that the two heteroatoms are linked to each other through a direct, covalent bond. By "indirectly" linked is meant that one or more spacer atoms are present between the heteroatoms; generally, the "indirect" linkage herein refers to the presence of a single atom (that may or may not be substituted) to which each heteroatom is linked through a direct covalent bond. Preferably, the bicyclic or polycyclic olefin monomer contains one double bond, and the two heteroatoms are symmetrically positioned with respect to any axis that is perpendicular to the double bond.

As an example, the bicyclic or polycyclic olefin monomer may be represented by the structure of formula (VII)

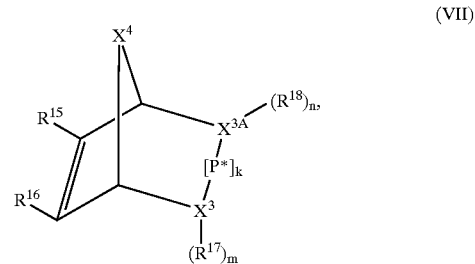

(VII)

wherein the various substituents are as follows:

$X^3$ and $X^{3A}$ are heteroatoms selected from O, N and S, and P* is a protecting group. The definitions of k, m, and n derive from the identity of the $X^3$ and $X^{3A}$ heteroatoms. That is, k is zero when one or both of $X^3$ or $X^{3A}$ are N, and is 1 when neither $X^3$ nor $X^{3A}$ is N. Therefore, if one of $X^3$ and $X^{3A}$ is N and the other is N or O, the monomer contains a direct covalent bond between two nitrogen atoms or between a nitrogen atom and an oxygen atom, whereas when $X^3$ and $X^{3A}$ are O or S, the monomer contains a linkage P* between $X^3$ and $X^{3A}$, where P* serves as a protecting group for both heteroatoms. In addition, m is necessarily zero when $X^3$ is O or S, and is 1 when $X^3$ is N. Similarly, n is necessarily zero when $X^{3A}$ is O or S, and n is 1 when $X^{3A}$ is N.

$X^4$ is a one-atom or two-atom linkage, i.e., a linkage that introduces one or two optionally substituted spacer atoms between the two carbon atoms to which $X^4$ is bound. Generally, although not necessarily, $X^4$ will be of the formula —CR$^{19}$R$^{20}$—(X$^5$)$_h$— wherein h is zero or 1, $X^5$ is CR$^{21}$R$^{22}$, O, S, or NR$^{23}$, and $R^{19}$, $R^{20}$, $R^{21}$, $R^{22}$, and $R^{23}$ are independently selected from hydrogen, hydrocarbyl (e.g., $C_1$–$C_{20}$ alkyl, $C_2$–$C_{20}$ alkenyl, $C_2$–$C_{20}$ alkynyl, $C_5$–$C_{20}$ aryl, $C_6$–$C_{24}$ alkaryl, $C_6$–$C_{24}$ aralkyl, $C_1$–$C_{20}$ alkyl, $C_5$–$C_{20}$ aryl, $C_5$–$C_{30}$ aralkyl, or $C_5$–$C_{30}$ alkaryl), substituted hydrocarbyl (e.g., substituted $C_1$–$C_{20}$ alkyl, $C_2$–$C_{20}$ alkenyl, $C_2$–$C_{20}$ alkynyl, $C_5$–$C_{20}$ aryl, $C_6$–$C_{24}$ alkaryl, $C_6$–$C_{24}$ aralkyl, $C_1$–$C_{20}$ alkyl, $C_5$–$C_{20}$ aryl, $C_5$–$C_{30}$ aralkyl, or $C_5$–$C_{30}$ alkaryl), heteroatom-containing hydrocarbyl (e.g., $C_1$–$C_{20}$ heteroalkyl, $C_5$–$C_{20}$ heteroaryl, heteroatom-containing $C_5$–$C_{30}$ aralkyl, or heteroatom-containing $C_5$–$C_{30}$ alkaryl), substituted heteroatom-containing hydrocarbyl (e.g., substituted $C_1$–$C_{20}$ heteroalkyl, $C_5$–$C_{20}$ heteroaryl, heteroatom-containing $C_5$–$C_{30}$ aralkyl, or heteroatom-containing $C_5$–$C_{30}$ alkaryl) and functional groups such as those enumerated in part (I) of this section.

When h is 1, preferred linkages are wherein $X^5$ is CR$^{21}$R$^{22}$, giving rise to a substituted or unsubstituted ethylene moiety. That is, when $R^{19}$, $R^{20}$, $R^{21}$, and $R^{22}$ are hydrogen, then $X^4$ is ethylene. When h is zero, the linkage is substituted or unsubstituted methylene, and a particularly preferred linkage within this group is methylene per se (i.e., when $R^{19}$ and $R^{20}$ are both hydrogen.)

One of $R^{15}$ and $R^{16}$ is hydrogen and the other is selected from hydrogen, hydrocarbyl (e.g., $C_1$–$C_{20}$ alkyl, $C_5$–$C_{20}$ aryl, $C_5$–$C_{30}$ aralkyl, or $C_5$–$C_{30}$ alkaryl), substituted hydrocarbyl (e.g., substituted $C_1$–$C_{20}$ alkyl, $C_5$–$C_{20}$ aryl, $C_5$–$C_{30}$ aralkyl, or $C_5$–$C_{30}$ alkaryl), heteroatom-containing hydrocarbyl (e.g., $C_1$–$C_{20}$ heteroalkyl, $C_5$–$C_{20}$ heteroaryl, heteroatom-containing $C_5$–$C_{30}$ aralkyl, or heteroatom-containing $C_5$–$C_{30}$ alkaryl), substituted heteroatom-containing hydrocarbyl (e.g., substituted $C_1$–$C_{20}$ heteroalkyl, $C_5$–$C_{20}$ heteroaryl, heteroatom-containing $C_5$–$C_{30}$ aralkyl, or heteroatom-containing $C_5$–$C_{30}$ alkaryl), and —(L)$_v$—Fn wherein v is zero or 1, L is hydrocarbylene, substituted hydrocarbylene and/or heteroatom-containing hydrocarbylene, and Fn is a functional group. Preferred functional groups include, without limitation, hydroxyl, sulfhydryl, $C_1$–$C_{20}$ alkoxy, $C_5$–$C_{20}$ aryloxy, $C_2$–$C_{20}$ acyloxy, $C_2$–$C_{20}$ alkoxycarbonyl, $C_6$–$C_{20}$ aryloxycarbonyl, halocarbonyl, carboxy, carbamoyl, mono-($C_1$–$C_{20}$ alkyl)-substituted carbamoyl, di-($C_1$–$C_{20}$ alkyl)-substituted carbamoyl, mono-($C_5$–$C_{20}$ aryl)-substituted carbamoyl, cyano, cyanato, formyl, amino, mono- and di-substituted amino, nitro, nitroso, sulfo, $C_1$–$C_{20}$ alkylsulfanyl, $C_5$–$C_{20}$ arylsulfanyl, $C_1$–$C_{20}$ alkylsulfonyl, $C_5$–$C_{20}$ arylsulfonyl, $C_1$–$C_{20}$ alkylsulfinyl, $C_5$–$C_{20}$ arylsulfinyl, boryl, borono, boronato, phospho, phosphino, silyl, and silyloxy.

P*, as indicated above, is a protecting group. P* is inert with respect to the reagents and reaction conditions used for polymerization, as well as the reagents and conditions used for any subsequent reactions (e.g., hydrogenation, as described infra), but must be removable following completion of ROMP and any subsequent polymer modification reactions. As may be deduced from the structure of formula (VII) and the above definitions, P* is a protecting group for functional groups having the structure —$X^3H$ (or —$X^{3A}H$), wherein $X^3$ (or $X^{3A}$) is O or S. Accordingly, when $X^3$ and $X^{3A}$ are O or S, P* will be a protecting group "linkage" used to protect 1,3-diols and 1,3-dithiols, respectively. A number of such bifunctional protecting groups are known in the art and described, for example, in Greene et al., *Protective Groups in Organic Synthesis*, 3$^{rd}$ Ed. (New York: Wiley, 1999). In the present method, a preferred protecting group for 1,3-diols (i.e., cyclic olefins of formula (VII) wherein $X^3$ and $X^{3A}$ is OH) is —Si($R^{24}$)$_2$— wherein $R^{24}$ is tertiary alkyl, preferably tertiary lower alkyl, e.g., t-butyl, and the deprotecting agent normally used is tetrabutylammonium fluoride. Other preferred protecting groups for 1,3-diols are cyclic acetals and ketals, such as methylene acetal, ethylidene acetal, t-butylmethylidene ketal, 1-t-butylethylidene ketal, 1-phenylethylidene ketal, cyclopentylidene ketal, cyclohexylidene ketal, benzylidene acetal, and acetonide (isopropylidene ketal), with acetonide particularly preferred. Such groups are typically removed via acid hydrolysis, preferably, although not necessarily, at an elevated temperature. With acetonide-protected 1,3-diols, deprotection may be achieved not only via acid hydrolysis, but also using other means, e.g., with boron trichloride or bromine. Preferred protecting groups for 1,3-dithiols (i.e., cyclic olefins of formula (VII) wherein $X^3$ is SH) are methylene, benzylidene (both removable with sodium/ammonia), and isopropylidene (removable with mercury (II) chloride).

$R^{17}$ and $R^{18}$ are independently selected from hydrogen, hydrocarbyl, substituted hydrocarbyl, heteroatom-containing hydrocarbyl, substituted heteroatom-containing hydrocarbyl, and amino protecting groups. $R^{17}$ and $R^{18}$ may also be linked to form a protecting group linking the nitrogen atoms to which they are attached. Removal of such protecting groups and regeneration of the unprotected amino moieties can be carried out using the method of Bøgevig et al. (2002) *Angew. Chem. Int. Ed.* 41:1790–1793.

Representative olefin monomers in which $X^3$ and $X^{3A}$ are different are those wherein k and m are zero, n is 1, $X^3$ is O, $X^{3A}$ is N, and $R^{18}$ is an amino protecting group, e.g., a carboxylic acid ester such as —(CO)—O-t-Bu. When $X^4$ is methylene, and $R^{15}$ and $R^{16}$ are hydrogen, the monomer is 2-oxa-3-aza-bicyclo[2.2.1]hept-5-ene-3-carboxylic acid t-butyl ester, having the structure (VIIA)

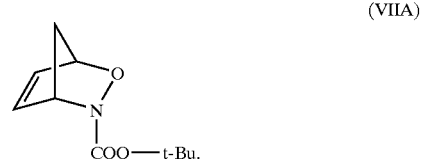

(VIIA)

The monomer can be readily synthesized using a hetero-Diels Alder reaction. See Mulvihill et al. (1998), *J. Org. Chem.* 63:3357. Following polymerization, deprotection can be achieved using the method of Vogt et al. (1998) *Tetrahedron* 54:1317–1348.

Representative olefin monomers in which $X^3$ and $X^{3A}$ are the same are those wherein $X^3$ and $X^{3A}$ are O, k is 1, m, and n are zero, and P* is a protecting group for 1,3-diols. When $X^4$ is methylene, and $R^{15}$ and $R^{16}$ are hydrogen, an exemplary monomer is 3,3-di-tert-butyl-2,4-dioxa-3-sila-bicyclo[3.2.1]oct-6-ene (compound (3) in the examples):

Regioregular polymers can be readily synthesized using monomers of formula (VII) in which $X^{3A}$ is identical to $X^3$, $X^4$ is methylene or substituted methylene (i.e., $CR^{19}R^{20}$ wherein $R^{19}$ and $R^{20}$ are as defined earlier herein), $R^{18}$ is identical to $R^{17}$, and n is identical to m, such that the synthesized polymer is an unsaturated regioregular polymer comprised of recurring units having the structure of formula (VIII)

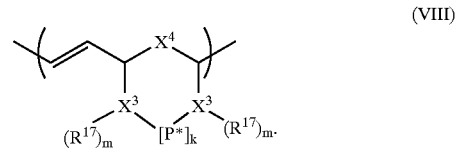

(VIII)

It will be appreciated that when $X^3$ is O or S, such that m is zero and k is 1, the unsaturated regioregular polymer is comprised of recurring units having the structure of formula (VIIIA)

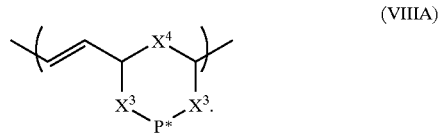

(VIIIA)

The polymerization reaction is generally carried out in an inert atmosphere by dissolving a catalytically effective amount of an olefin metathesis catalyst (preferably a Group 8 transition metal complex of formula (I)) in a solvent, and adding the bicyclic or polycyclic olefin monomer (preferably a monomer of formula (VII)), optionally dissolved in a solvent, to the catalyst solution. Preferably, the reaction is agitated (e.g., stirred). The progress of the reaction can be monitored by standard techniques, e.g., nuclear magnetic resonance spectroscopy. Examples of solvents that may be used in the polymerization reaction include organic, protic, or aqueous solvents that are inert under the polymerization conditions, such as aromatic hydrocarbons, chlorinated hydrocarbons, ethers, aliphatic hydrocarbons, alcohols, water, or mixtures thereof. Preferred solvents include benzene, toluene, p-xylene, methylene chloride, 1,2-dichloroethane, dichlorobenzene, chlorobenzene, tetrahydrofuran, diethylether, pentane, methanol, ethanol, water, or mixtures thereof. More preferably, the solvent is benzene, toluene, p-xylene, methylene chloride, 1,2-dichloroethane, dichlorobenzene, chlorobenzene, tetrahydrofuran, diethylether, pentane, methanol, or ethanol. Most preferably, the solvent is toluene or 1,2-dichloroethane. The solubility of the polymer formed in the polymerization reaction will depend on the choice of solvent and the molecular weight of the polymer obtained. Under certain circumstances, no solvent is needed.

Figures 2A, 2B:
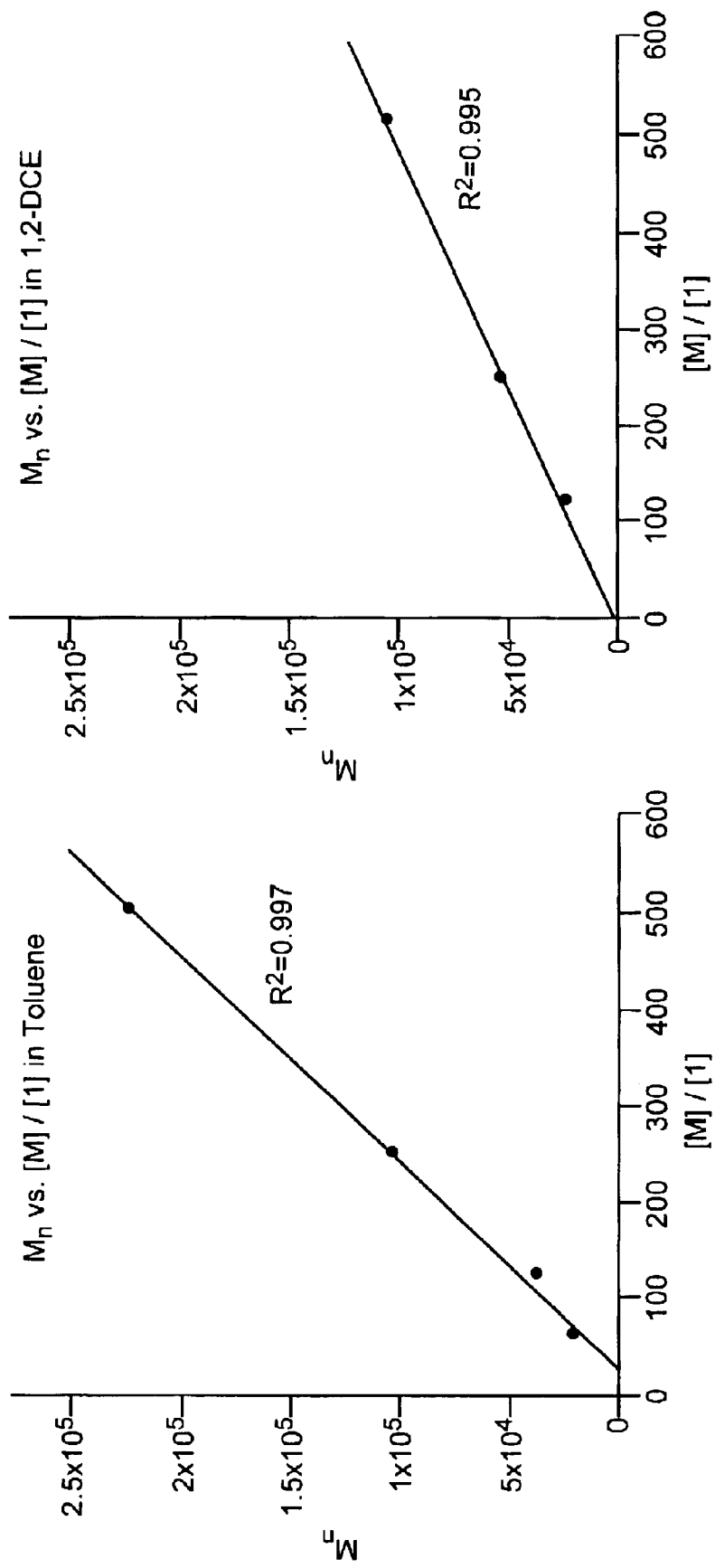
FIGS. 2A and 2B are graphs of number average molecular weight $M_n$ versus the [monomer]/[catalyst] ratio for polymer (4), as discussed in Example 1.

Reaction temperatures can range from about 0° C. to 100° C., and are preferably in the range of about 25° C. to 75° C., and the reaction time will generally be in the range of about 12 to 48 hours. The molar ratio of cyclic olefin monomer to the catalyst is selected based on the desired molecular weight of the polymer, the desired polydispersity index (PDI, defined as $M_w:M_n$), and the activity of the particular catalyst. As the present method is a controlled polymerization, there is a substantially linear relationship between molecular weight and the monomer/catalyst ratio (see Example 1 and FIGS. 2A and 2B). With more active catalysts, the polymerization reaction can proceed with far less catalyst, so that the [monomer]/[catalyst] ratio can be extraordinarily high (see Example 2), reducing overall cost significantly. However, to achieve a lower PDI, i.e., a PDI of at most about 1.4, a less active catalyst is desirable, in which case the [monomer]/[catalyst] ratio will be lower (see Example 1). In general, the transition metal carbene complexes of formula (IIA) are more active than the bisphosphine catalysts of formula (I) (i.e., complexes wherein $L^1$ and $L^2$ are tri-substituted phosphines or analogous ligands, as explained in part (II)). Accordingly, the former catalysts are preferred for minimizing catalyst loading and achieving a broader molecular weight distribution, i.e., a PDI of 2 or more, while the latter catalysts are preferred when higher catalyst loadings are acceptable and a narrower molecular weight distribution, i.e., a PDI of 1.4 or less, is desired. Achieving an $M_n$ of over 200,000 will generally require a molar ratio of monomer to catalyst of 500:1 or more (see Example 2).

In order to provide a saturated regioregular polymer, the unsaturated polymer of formula (VIII) is hydrogenated using conventional reagents and conditions, e.g., using tosyl hydrazide as described in Example 3. The resulting hydrogenated polymer is comprised of recurring units having the structure of formula (IX)

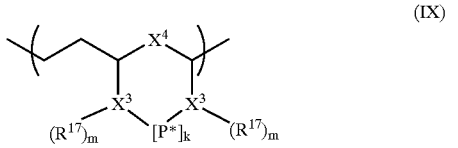

(IX)

When the unsaturated polymer is comprised of recurring units having the structure of formula (VIIIA), the hydrogenated polymer, correspondingly, is comprised of recurring units having the structure of formula (IXA)

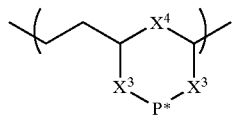

(IXA)

Deprotection of (IX) is then effected as described above, using a reagent effective to provide a deprotected regioregular polymer comprised of recurring units having the formula (X)

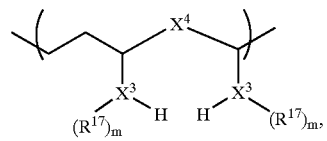

(X)

which, when $X^3$ is O or S, such that m is zero and k is 1, have the structure of formula (XA)

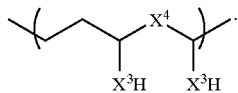

(XA)

The methodology of the invention also extends to the synthesis of telechelic polymers via a ROMP reaction. Telechelic polymers, as is well known, are macromolecules with one or more reactive end groups. Telechelic polymers are useful materials for chain extension processes, block copolymer synthesis, reaction injection molding, and network formation. Uses for telechelic polymers and syntheses thereof are described in Goethals, *Telechelic Polymers: Synthesis and Applications* (CRC Press: Boca Raton, Fla., 1989).

For most applications, highly functionalized telechelic polymers are preferred. Thus, it is desirable that the catalyst used to form the telechelic polymer be stable in the presence of functional groups. The Group 8 transition metal complexes described in part (II) are, in fact, stable with respect to a wide variety of functional groups, as described, for example, in U.S. Pat. Nos. 5,312,940, 5,342,909, 5,917,071 5,969,170, 6,111,121, and 6,313,332 to Grubbs et al., and in U.S. patent application Ser. No. 10/114,418 to Grubbs et al., filed Apr. 1, 2002, for "Cross-Metathesis Reaction of Functionalized and Substituted Olefins Using Group 8 Transition Metal Carbene Complexes as Metathesis Catalysts," all of which are commonly assigned herewith to the California Institute of Technology.

In implementing the present methodology to synthesize telechelic polymers, the ROMP reaction is carried out in the presence of acyclic olefins act that as chain transfer agents to regulate the molecular weight of polymers produced. When α,ω-difunctional olefins are employed as chain transfer agents, difunctional telechelic polymers can be synthesized, and such difunctional olefins are the preferred chain transfer agents herein. When carrying out a ROMP reaction using a symmetric, α,ω-difunctional olefin as a chain transfer agent, the propagating alkylidene generated during the ring-opening metathesis process is terminated with a functional group, and the new functionally substituted alkylidene reacts with a monomer to initiate a new chain. This process preserves the number of active catalyst centers and leads to symmetric telechelic polymers with a functionality that approaches 2.0. The only polymer end groups that do not contain residues from the chain transfer agent are those from the initiating alkylidene and the end-capping reagent. In principle, these end groups could be chosen to match the end group from the chain transfer agent. See U.S. Pat. No. 5,880,231 to Grubbs et al.

In general, the α,ω-difunctional olefin that serves as the chain transfer agent (CTA) has the structure of formula (XI)

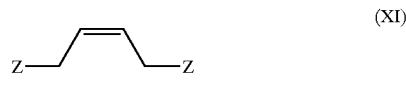

(XI)

wherein Z comprises a functional group selected from halide, hydroxyl, sulfhydryl, $C_2$–$C_{20}$ acyloxy, $C_2$–$C_{20}$ alkoxycarbonyl, $C_6$–$C_{20}$ aryloxycarbonyl, halocarbonyl, $C_2$–$C_{20}$ alkylcarbonato, $C_6$–$C_{20}$ arylcarbonato, carboxy, carbamoyl, mono-substituted carbamoyl, disubstituted carbamoyl, thiocarbamoyl, carbamido, cyano, cyanato, formyl, thioformyl, amino, mono-substituted amino, di-substituted amino, imino, alkylimino, arylimino, nitro, nitroso, sulfo, $C_1$–$C_{20}$ alkylsulfanyl, $C_5$–$C_{20}$ arylsulfanyl, $C_1$–$C_{20}$ alkylsulfinyl, $C_5$–$C_{20}$ arylsulfinyl, $C_1$–$C_{20}$ alkylsulfonyl, arylsulfonyl, boryl, phosphono, phospho, and phosphino. Preferred Z groups are selected from hydroxyl, sulfhydryl, $C_2$–$C_{12}$ acyloxy, carboxy, $C_2$–$C_{12}$ alkoxycarbonyl, $C_6$–$C_{15}$ aryloxycarbonyl, amino, carbamoyl, and formyl.

Regioregular telechelic polymers can be synthesized with a cyclic olefin monomer of formula (VII) in which $X^{3A}$ is identical to $X^3$, $X^4$ is methylene or substituted methylene (i.e., $CR^{19}R^{20}$ wherein $R^{19}$ and $R^{20}$ are as defined earlier herein), $R^{18}$ is identical to $R^{17}$, and n is identical to m, such that the telechelic polymer resulting from the ROMP reaction is an unsaturated, regioregular polymer having the structure of formula (XII)

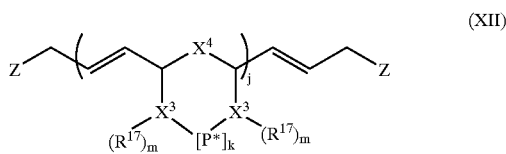

(XII)

wherein j is the number of recurring monomer units in the polymer, and $X^3$, $X^4$ $R^{17}$, k, and m are as defined with respect to formula (VIII). As above, when $X^3$ is O or S, such that k is 1 and m is zero, the telechelic polymer of formula (XII) has the structure of formula (XIIA)

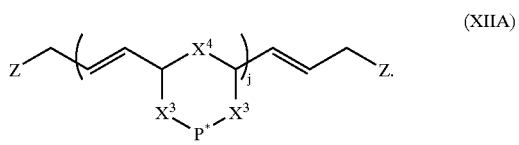

(XIIA)

Polymer (XII) may then be hydrogenated, as described previously, to give a saturated telechelic polymer having the structure (XIII)

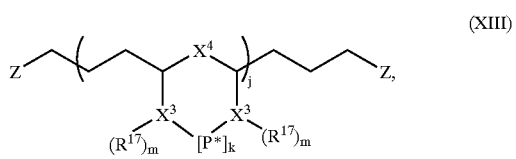

(XIII)

which, when $X^3$ is O or S, such that k is 1 and m is zero, has the structure of formula (XIIIA)

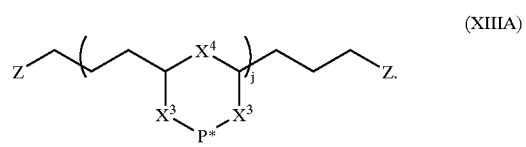

(XIIIA)

Deprotection of (XIII) provides a saturated, deprotected telechelic polymer having the structure of formula (XIV)

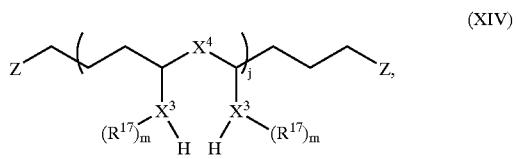

(XIV)

while deprotection of (XIIIA) results in a saturated, deprotected telechelic polymer having the structure of formula (XIVA)

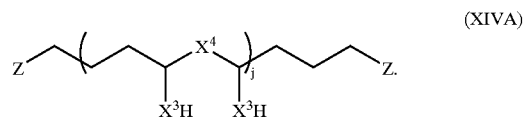

(XIVA)

The regioregular polymers provided using the present methodology, including unsaturated, saturated, deprotected, and/or telechelic polymers, are novel polymers and are claimed as such herein. Accordingly, it will be appreciated in light of the above description that novel polymers of the invention include, but are not limited to, polymers of formulae (VIII), (VIIIA), (IX), (IXA), (X), (XA), (XII), (XIIA), (XIII), (XIIIA), (XIV), and (XIVA). Accordingly, the novel polymers can be generally represented as those comprised of recurring units having the structure of formula (XV)

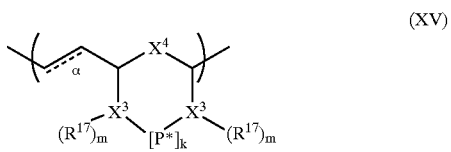

(XV)

wherein:
α is an optional double bond;
$X^3$ is O, N or S;
$X^4$ is $CR^{19}R^{20}$ wherein $R^{19}$ and $R^{20}$ are independently selected from hydrogen, substituted hydrocarbyl, heteroatom-containing hydrocarbyl, substituted heteroatom-containing hydrocarbyl, and functional groups;
k is zero when $X^3$ is N, and k is 1 when $X^3$ is O or S;
m is zero when $X^3$ is O or S, and m is 1 when $X^3$ is N;

$R^{17}$ is selected from hydrogen, hydrocarbyl, substituted hydrocarbyl, heteroatom-containing hydrocarbyl, substituted heteroatom-containing hydrocarbyl, and amino-protecting groups, or the two $R^{17}$ substituents may be taken together to form a cyclic group; and P* is a protecting group.

The polymer may be telechelic, in which case there are two terminal Z groups as indicated in formulae (XII) through (XIV), such that the polymer has the structure of formula (XVA)

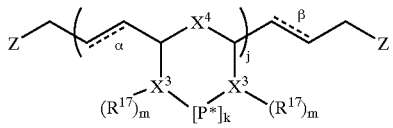

(XVA)

wherein j is the number of recurring monomer units in the polymer $X^3$, $X^4$ $R^{17}$, k, and m are as defined with respect to formula (VIII), and β is an optional double bond, wherein either both α and β are present as double bonds, or neither α nor β is present.

In another embodiment, the polymers are comprised of recurring units having the structure of formula (X)

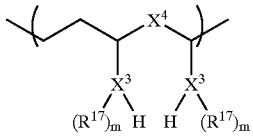

(X)

wherein $X^3$, $X^4$, $R^{17}$, and m are defined as for formula (XV), wherein, as above, the polymer may be telechelic and terminate in two Z groups, as described above with respect to polymers of formula (XVA).

Such polymers have the structure of formula (XB)

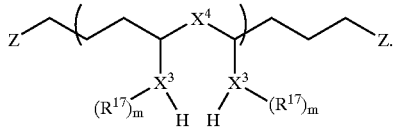

(XB)

The novel polymers have a number average molecular weight in the range of approximately 1,000 to approximately 1,000,000. In the preferred novel polymers, $X^3$ is O or S, and $R^{19}$ and $R^{20}$ are hydrogen, such that the polymers are comprised of dyads having the structure of formula (XVI)

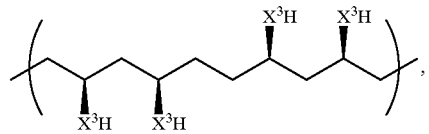

(XVI)

dyads having the structure of formula (XVII)

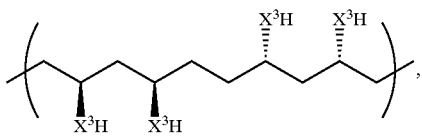

(XVII)

or combinations thereof, wherein $X^3$ is O or S. When $X^3$ is O and $T^1$ and $T^2$ are methyl, the polymer is regioregular MVOH, i.e., poly((vinyl alcohol)$_2$-alt-methylene).

It is to be understood that while the invention has been described in conjunction with the preferred specific embodiments thereof, that the foregoing description as well as the examples that follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

Experimental

General Procedures. NMR spectra were recorded on a Varian Mercury 300 (300 MHz for $^1$H and 74.5 MHz for $^{13}$C). All NMR spectra were recorded in CDCl$_3$ or DMSO-d$_6$ and referenced to residual proteo species. Gel permeation chromatography (GPC) was carried out on two PLgel 5 mm mixed-C columns (Polymer Labs) connected in series with a DAWN EOS multiangle laser light scattering (MALLS) detector and an Optilab DSP differential refractometer (both from Wyatt Technology). No calibration standards were used, and dn/dc values were obtained for each injection assuming 100% mass elution from the columns. Differential scanning calorimetry (DSC) and thermogravimetric analysis were carried out simultaneously on a Netzsch STA 449C under a flow of $N^2$ at a heating rate of 10° C./min.

Materials. Toluene was dried by passage through solvent purification columns. cis-4-Cyclopentene-1,3-diol (>99%) was obtained from Fluka and used as received. cis-1,4-Diacetoxy-2-butene (95+%) (6) was obtained from TCI America and degassed by an argon purge prior to use. N,N-Dimethylformamide (anhydrous) (DMF), 1,2-dichloroethane (anhydrous), 2,6-lutidine (99+%, redistilled), and di-tert-butylsilylbis(trifluoromethanesulfonate) (97%) were obtained from Aldrich and used as received. (PCy$_3$)$_2$(Cl)$_2$Ru=CHPh (1) was synthesized according to Schwab et al. (1996) J. Am. Chem. Soc. 118:100–110, (ImesH$_2$)-(PCY$_3$)(Cl)$_2$Ru=CHPh (2) was synthesized as described in Sanford et al. (2001) J. Am. Chem. Soc. 123:749–750, and 3,3-di-tert-butyl-2,4-dioxa-3-sila-bicyclo[3.2.1]oct-6-ene (3) was synthesized according to Lang et al. (1994) Helv. Chim. Acta 77:1527–1540.

EXAMPLE 1

Polymerization of 3,3-di-tert-butyl-2,4-dioxa-3-silabicyclo[3.2.1]oct-6-ene (3) via ROMP with Catalyst (1)

SCHEME 2

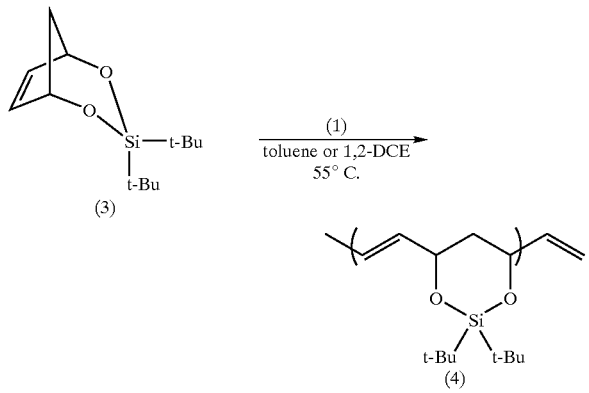

Representative procedure for synthesis of a protected, unsaturated, regioregular polymer (Scheme 2): A small vial was charged with 0.25 g (1.0 mmol) of monomer (3) and a stirbar. The monomer was degassed by three freeze-pump-thaw cycles. 3.4 mg ($4.13 \times 10^{-6}$ mol) of catalyst (1) was added as a solution in 1,2-dichloroethane or toluene (1 mL of solvent). The vial was placed in a 55° C. aluminum heating block, stirring under argon for approximately 20 h. The reaction mixture was dissolved in 3 mL of dichloromethane and precipitated into 50 mL of stirring methanol. The white polymer precipitate was washed several times with methanol and dried in vacuo overnight; yield of polymer (4), 77–95%. $^1$H NMR (300 MHz, CDCl$_3$): 5.75 trans (bs, 2H), 5.38 cis (d, J=4.0 Hz, 2H), 5.08 cis (d, J=8.8 Hz, 2H), 4.62 trans (d, J=10.2 Hz, 2H), 1.4–1.8 (m, 2H), 1.0 (18H). $^{13}$C NMR (75 MHz, CDCl$_3$): 132.3, 131.4, 131.1, 73.3, 70.7, 42.9, 42.6, 27.6, 27.5, 27.3, 22.8, 20.0, 19.9.

The process was repeated using varying amounts of (1) at 55° C. (Table 1). All polymerizations reached high conversion (≧80%) in approximately 1 day and were fully characterized by $^1$H/$^{13}$C NMR (FIGS. 1A and 1C) and MALLS/SEC. Over the molecular weight range $2 \times 10^4$ to $2.2 \times 10^5$ g/mol, PDI values were relatively low and constant for polymers produced in both chlorinated and aromatic solvents. Also, it is evident that the [3]/[1] ratio is reflected in the $M_n$ of each polymer in a linear fashion. The graphs in FIGS. 2A and 2B display the molecular weight versus [monomer]/[catalyst] ratios for the series P1–4, carried out in toluene, and P5–7, carried out in 1,2-dichloroethane (1,2-DCE). The slopes of the graphs in FIGS. 2A and 2B differ by a factor of approximately 2, which indicates a difference in the initiation rates of catalyst (1) in toluene and 1,2-DCE. Catalyst (1) appears to be initiating more readily in 1,2-DCE (P5–7), as the slope of roughly 1 is obtained when plotting DP vs. [monomer]/[catalyst]. A difference in initiation rates for (1) was previously observed (Sanford et al. (2001) *J. Am. Chem. Soc.* 123:6543–6554), and these data are consistent with faster initiation in chlorinated vs. aromatic solvents. Low PDI's and the linear relationship between molecular weight vs. [monomer]/[catalyst] are characteristic of a controlled polymerization.

TABLE 1

| polymer | monomer/catalyst[d] | time (h) | % yield | $M_n$ (×10$^{-3}$) GPC[a] | $M_w$ (×10$^{-3}$) GPC[a] | PDI |
|---|---|---|---|---|---|---|
| P1[b] | 63 | 21 | 90 | 21.8 | 28.4 | 1.3 |
| P2[b] | 130 | 17 | 97 | 39.3 | 51.7 | 1.3 |
| P3[b] | 250 | 24 | 95 | 103.4 | 139.2 | 1.3 |
| P4[b] | 510 | 18 | 95 | 222.3 | 309.1 | 1.4 |
| P5[c] | 120 | 21 | 84 | 24.2 | 33.7 | 1.4 |
| P6[c] | 250 | 27.5 | 77 | 55.3 | 73.9 | 1.3 |
| P7[c] | 510 | 27.5 | 80 | 105.8 | 131.6 | 1.2 |

[a]Samples run in THF; molecular weight values obtained using MALLS with an average dn/dc value of 0.108 mL/g.
[b]Polymerizations run in toluene.
[c]Polymerizations run in 1,2-DCE.
[d]Catalyst (1) used for polymerization.

EXAMPLE 2

Polymerization of 3,3-di-tert-butyl-2,4-dioxa-3-silabicyclo[3.2.1]oct-6-ene (3) via ROMP with Catalyst (2) and CTA (5)

SCHEME 3

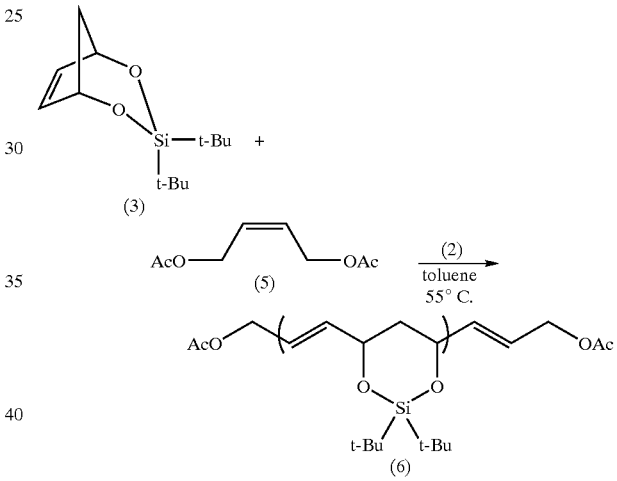

Representative procedure for synthesis of an unsaturated, protected, telechelic polymer (Scheme 3): A small vial was charged with 0.25 g (1.0 mmol) of monomer (3) and a stirbar. The monomer was degassed by three freeze-pump-thaw cycles. Under an argon atmosphere, 0.25 mL ($1.0 \times 10^{-2}$) mmol) of a 6.90 mg/mL solution of (5) (as a charge transfer agent, or "CTA") in toluene solution was added via a syringe. Then 0.75 mL ($5.3 \times 10^{-5}$ mmol) of a 0.0595 mg/mL solution of (2) in toluene was added via a syringe. The vial was placed in a 55° C. heating apparatus and left stirring under argon for 23–113 h. The reaction mixture was dissolved in 2 mL of dichloromethane and precipitated into 50 mL of stirring methanol. The white polymer precipitate was washed several times with methanol and dried in vacuo overnight; yield of polymer (6) 82–90%. $^1$H NMR (300 MHz, CDCl$_3$): 5.73 trans (m, 2H), 5.35 cis (m, 2H), 5.06 cis (m, 2H), 4.62 trans (d, J=10.2 Hz, 2H), 1.4–1.8 (m, 2H), 1.0 (18H). $^{13}$C NMR (75 MHz, CDCl$_3$): 131.6, 131.3, 73.5, 43.2, 27.7, 27.6, 23.0, 20.2, 20.1.

The aforementioned process was repeated using different ratios of (3) to (2), different ratios of (3) to (5), and different reaction times, as indicated in Table 2. The molecular weight data is given in Table 2 as well. As may be seen in the table, when complex (2) was used as the ROMP catalyst, the molecular weight of the resulting telechelic polymer was controlled solely by the [monomer]/[CTA] ratio at thermodynamic equilibrium; furthermore, much lower catalyst loadings could be employed, thereby reducing costs considerably. When the ROMP of (3) with CTA (5) was carried out in toluene, the $M_n$ was controlled by the ratio of [3]/[5], and high conversions were obtained with a catalyst loading up to $4 \times 10^4$.

Figures 1C, 1D:
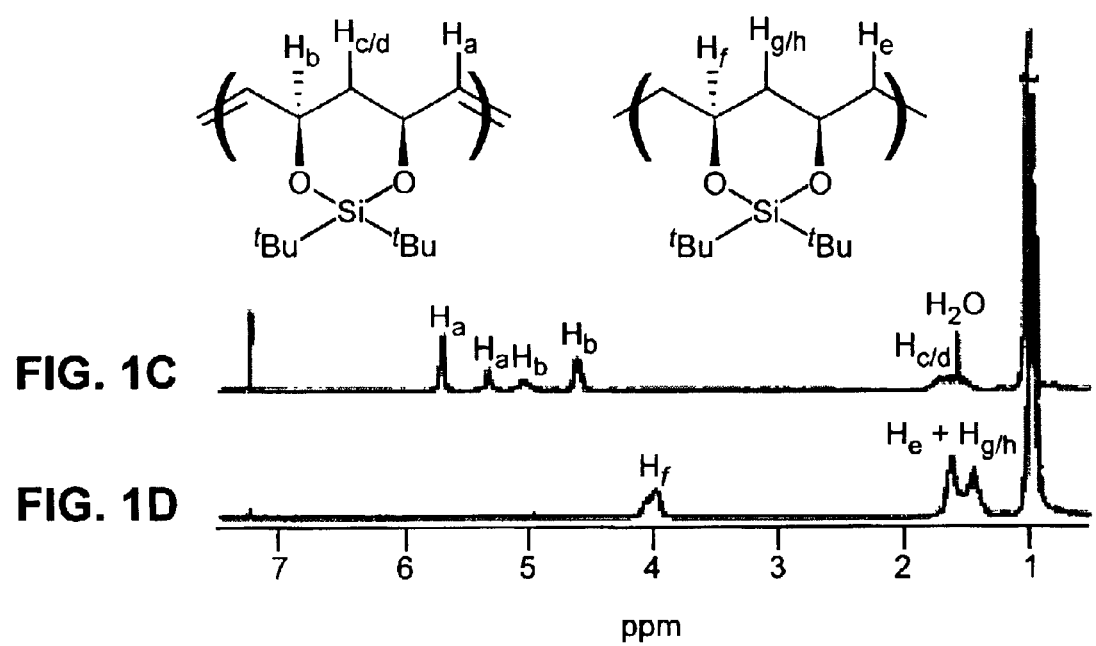

Entries P8–10 in Table 2 indicate that thermodynamic equilibrium was reached within 24 h, after which the molecular weight and conversion remained constant. As expected, as the monomer]/[CTA] ratio is doubled, the $M_n$ increases by a factor of 2 (P8 and P11).

hydrogenation, the loss of olefinic carbons is clearly evident in FIG. 1B as the carbon, 1, in the $sp^2$ region at 131–132 ppm has disappeared and a new carbon, 1', appears in the $sp^3$ region at 34 ppm. FIG. 1C displays the $^1$H NMR spectrum prior to saturation of the backbone. The four peaks between 4 and 6 ppm in FIG. 1C represent the two sets of cis and trans olefin protons, $H_a$, and methine protons, $H_b$. For polymers made with catalyst (1) (P1–7), integration is consistent between the two sets with a 1.4/0.6 trans/cis ratio or 70% trans olefins along the polymer backbone, while polymers made with catalyst (2) (P8–11) consisted of 50% trans olefins. These sets of peaks disappear (FIG. 1D) upon hydrogenation as the cis and trans methine protons collapse to a singe peak, $H_f$, at 4 ppm and new methylene protons, $H_e + H_{g/h}$, appear between 1.4 and 1.6 ppm.

TABLE 2

| polymer | monomer/ catalyst[c] | monomer/ CTA | time (h) | % yield | $M_n$ (×10$^{-3}$) GPC[a] | $M_w$ (×10$^{-3}$) GPC[a] | PDI |
|---|---|---|---|---|---|---|---|
| P8 | 20,000 | 100 | 23 | 84 | 57.4 | 145.0 | 2.5 |
| P9 | 20,000 | 100 | 70 | 82 | 58.3 | 134.3 | 2.3 |
| P10 | 20,000 | 100 | 113 | 80 | 57.1 | 151.1 | 2.6 |
| P11 | 40,000 | 200 | 22 | 87 | 120.2 | 278.7 | 2.3 |

[a]Samples run in THF, molecular weight values obtained using MALLS with an average dn/dc value of 0.110 mL/g.
[b]All polymerizations run in toluene.
[c]Catalyst (2) used for polymerization.

EXAMPLE 3

Hydrogenation of Polymers after ROMP

SCHEME 4

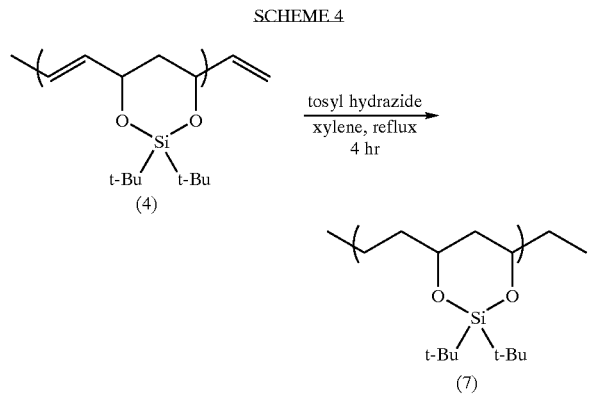

Representative procedure for hydrogenation of protected unsaturated polymers (Scheme 4): A dry flask was charged with 0.35 g of polymer (4), prepared in Example 1 ($M_n$= 80,360, PDI=1.3), 1.80 g of tosyl hydrazide (9.4 mmol, 6.5 equiv per double bond), 15 mL of xylenes, and a trace of BHT. The mixture was degassed by three freeze-pump-thaw cycles, and a reflux condenser was attached to the flask under argon. The reaction was heated to reflux for 4 h. The solution was cooled to room temperature and then precipitated into 125 mL of stirring methanol. The white polymer precipitate was washed several times with methanol and then dried in vacuo overnight; yield of polymer (7) was 0.34 g (99%). $M_n$=75,140 g/mol, PDI=1.2, dn/dc=0.076. $^1$H NMR (300 MHz, CDCl$_3$): 3.9–4.1 (2H), 1.4–1.7 (6H), 1.0 (18H). $^{13}$C NMR (75 MHz, CDCl$_3$): 74.1, 73.5, 73.4, 42.4, 42.3, 34.8, 34.3, 27.8, 27.7, 27.3, 22.8, 19.7.

FIG. 1A displays the $^{13}$C NMR spectrum of the unsaturated polymer (4) made with catalyst (1). Upon

EXAMPLE 4

Desilation of Saturated Polymers

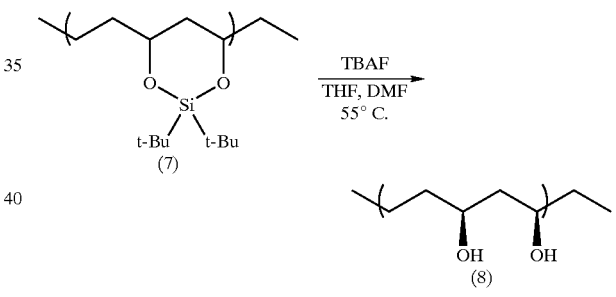

Representative procedure for deprotection of protected saturated polymers: A dry flask was charged with 0.1952 g of polymer (7), prepared in Example 3, and a stirbar. A reflux condenser was attached, and the system was purged with argon. 20 mL of dry THF was added followed by 10 mL of dry DMF, at which point the solution became cloudy white. 8 mL of tetrabutylammonium fluoride (TBAF) 1.0 M in THF was added via a syringe. The reaction was brought to reflux (75° C.) for 40 h. It was then cooled to room temperature and precipitated into 400 mL of 1:1 methanol:CH$_2$Cl$_2$ stirring at room temperature. A stringy precipitate was observed; it was vacuum-filtered and washed with copious amounts of both methanol and CH$_2$Cl$_2$ and dried under dynamic high vacuum overnight to provide polymer (8), poly((vinyl alcohol)$_2$-alt-methylene) ("MVOH"); yield of polymer (8), 0.0713 g (87%). $^1$H NMR (300 MHz, DMSOd$_6$): 4.53 (s, 2H), 3.56 (bs, 2H), 1.2–1.6 (6H). $^{13}$C NMR (75 MHz, DMSO-d$_6$): 69.3, 69.0, 44.4, 33.6, 33.3.

Figure 3A:
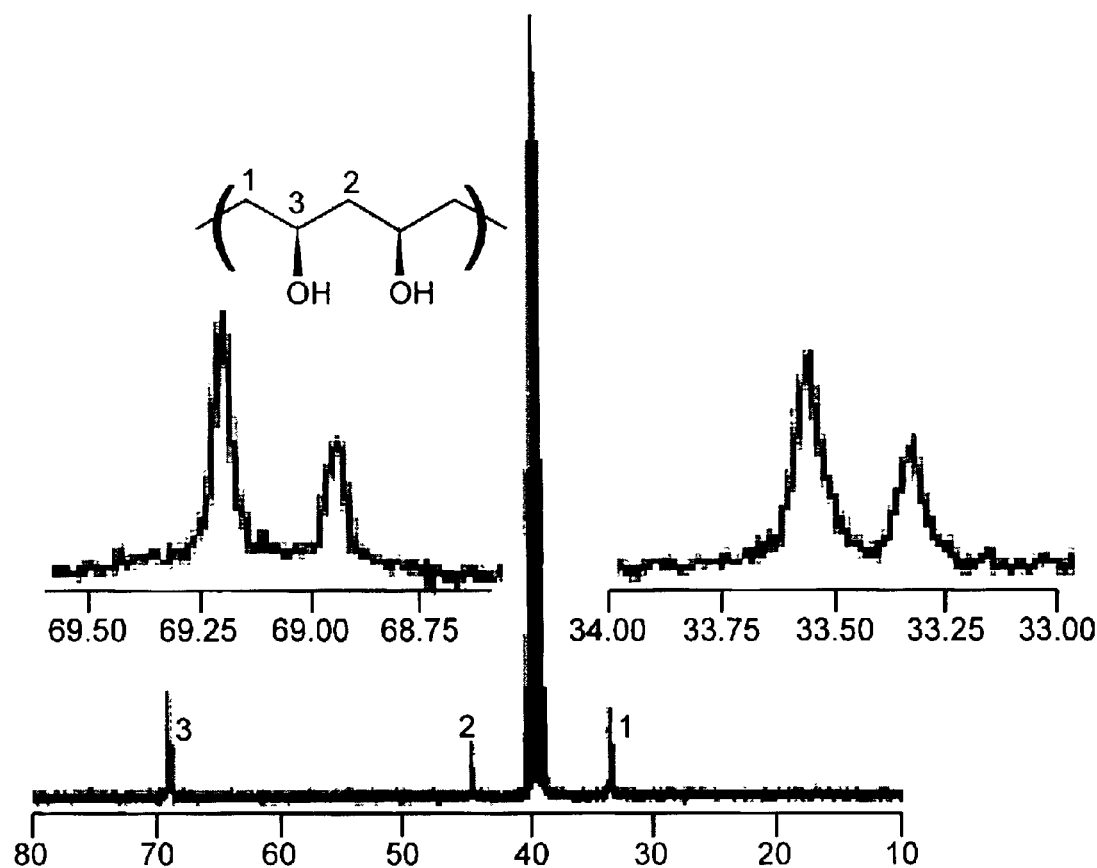
FIGS. 3A and 3B are $^{13}$C NMR and $^1$H NMR spectra, respectively, of polymer (8), i.e., unprotected poly((vinyl alcohol)$_2$-alt-methylene)(MVOH), prepared by desilation of polymer (7) as described in Example 4.

Once dried, the copolymers prepared using the aforementioned procedure were readily soluble in DMSO (at room temperature), but not in DMF, water, THF, or methanol. Only three sets of carbon resonances were observed in the $^{13}$C NMR spectrum of poly((vinyl alcohol)$_2$-alt-methylene originating from the ROMP polymer produced with catalyst (1) in DMSO-d6, as shown in FIG. 3A. The peaks labeled 1 and 3 in FIG. 3A each consists of two peaks as shown in the insets. The $^{13}$C NMR spectrum of MVOH originating from catalyst (2) differs from the spectrum shown in FIG. 3A only in that the peaks labeled 1 and 3 consist of two peaks of equal intensities. Recent research has elucidated the tacticity of poly(vinyl alcohol) (PVA) homopolymer with high-field NMR spectrometers. Nagara et al. report that the chemical shift data for the methine carbon (carbon 3 in FIG. 3A) follows the trend for triads: $\delta_{mm} > \delta_{mr/rm} > \delta_{rr}$ (Nagara et al. (2001) 42:9679–9686). By analogy, the methine region in FIG. 1A is suggestive of a higher m dyad tacticity for MVOH produced with catalyst 1. In contrast, the equal intensities of these peaks in the material produced with catalyst (2) suggest equal m and r dyad distributions; the m and r dyads are shown below:

m:

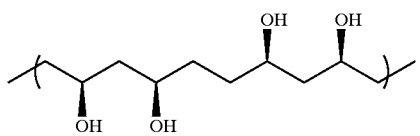

r:

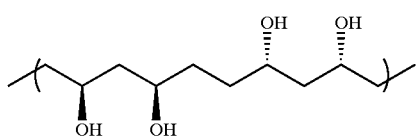

Figure 3B:
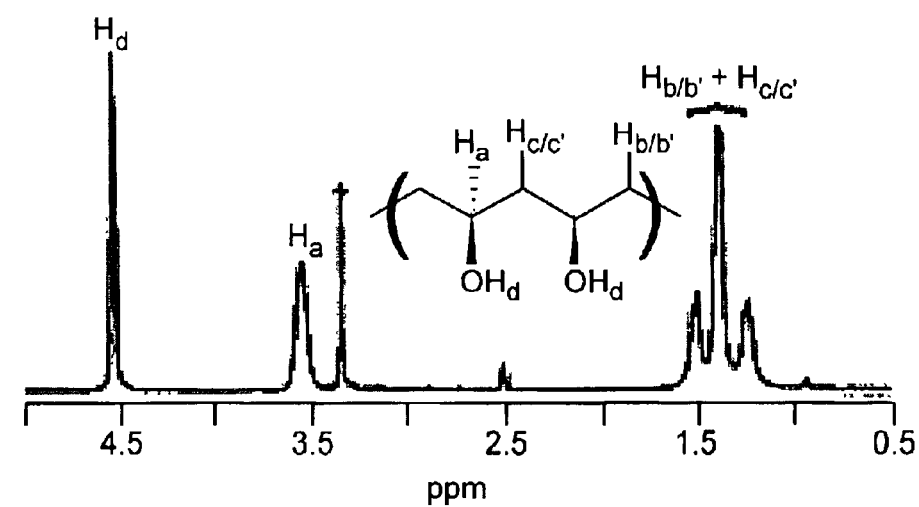

The carbon assigned as 2 can only exist in one local environment, as the two alcohol functionalities that surround it must always be in a cis relationship. The $^1$H NMR spectra in FIG. 3B shows complete removal of the silane protecting group, as no signals are present around 1.0 ppm. The peak at 4.5 ppm, H$_d$, was assigned to the alcohol protons as it disappeared upon addition of D$_2$O, leaving the peak at 3.6 ppm, H$_a$, to be assigned to the methine protons. The remaining peaks between 1.2 and 1.6 ppm, H$_{b/b'}$+H$_{c/c'}$, are assigned as the six methylene protons. All of these assignments are in good agreement with the similar EVOH copolymers previously prepared, and the $^1$H NMR spectra for MVOH made with catalysts (1) and (2) are the same.

Figures 4A, 4B:
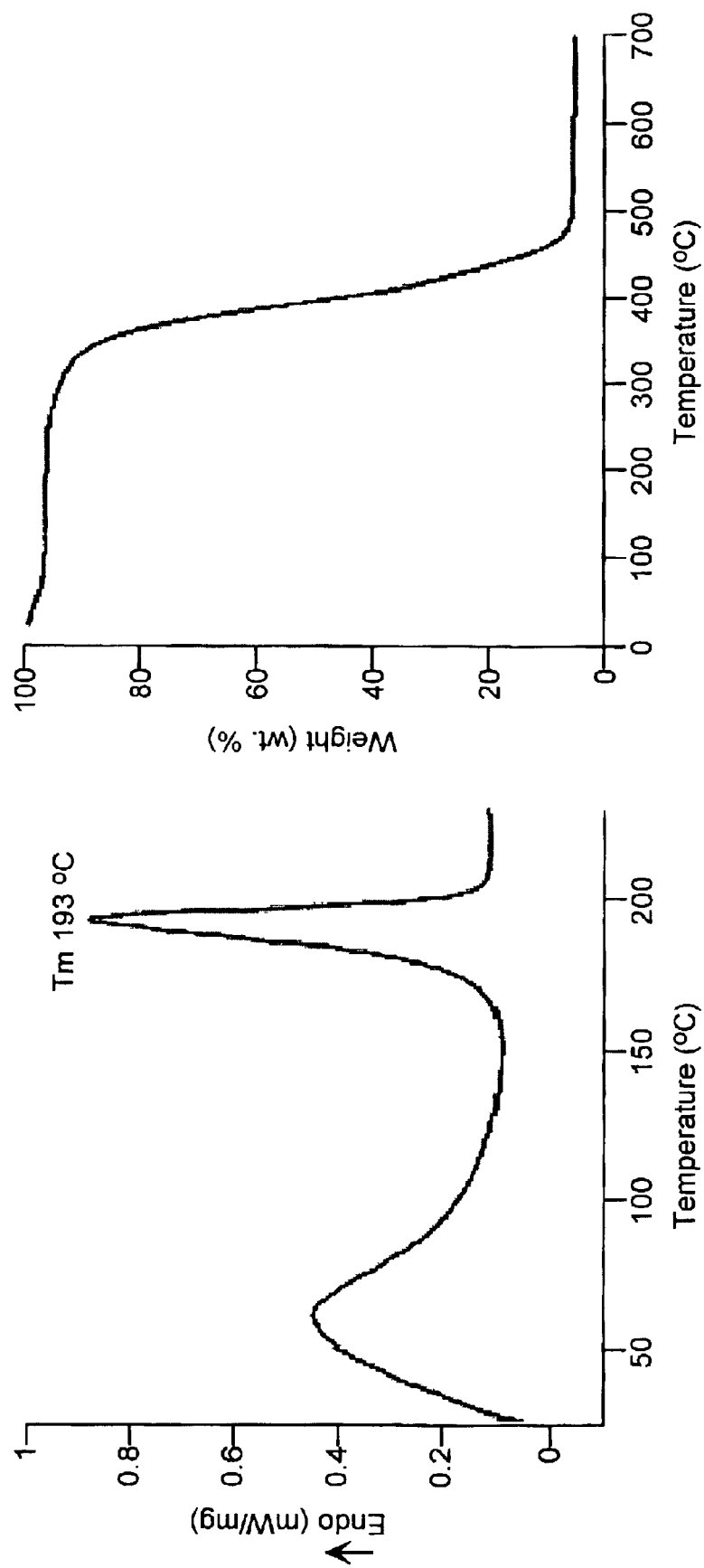
FIGS. 4A and 4B show the DSC thermogram and TGA curve, respectively, of polymer (8), as discussed in Example 4.

Thermal Analysis: FIG. 4A shows the DSC thermogram of the MVOH copolymer, originating from catalyst 1, with a clear melting transition at 193° C. (peak, 180° C. onset, a T$_m$ of 180° C. was observed for the MVOH originating from catalyst (2)). This high T$_m$ is consistent with a higher vinyl alcohol content in the copolymer as Mori et al. have shown that the T$_m$ of EVOH copolymers varies over the range of ca. 120–200° C. with increasing vinyl alcohol content (Mori et al. (1994) *Macromolecules* 27:1051–1056). The TGA curve displayed in FIG. 4B shows an onset to decomposition at 360° C. The thermal stability of the MVOH copolymer is substantially better than PVA homopolymer, which displays thermal weight loss slightly below 300° C. A small decrease in weight is observed in the TGA curve around 60° C. and coincides with a large peak in the DSC thermogram. This is consistent with elimination of methanol, likely trapped in the MVOH copolymer upon precipitation. The melting temperature and increased thermal stability relative to PVA are comparable with structurally similar EVOH materials.

We claim:

1. A method for synthesizing a polymer using a ring-opening metathesis polymerization (ROMP) reaction, comprising contacting a bridged bicyclic or polycyclic olefin monomer with a catalytically effective amount of an olefin metathesis catalyst under reaction conditions effective to allow the ROMP reaction to occur, wherein the olefin monomer contains a plurality of heteroatoms, at least two of which are directly or indirectly linked to each other.

2. The method of claim 1, wherein the olefin metathesis catalyst is a Group 8 transition metal complex having the structure of formula (I)

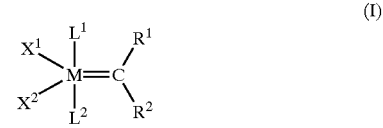

in which:
M is a Group 8 transition metal;
L$^1$ and L$^2$ are neutral electron donor ligands;
X$^1$ and X$^2$ are anionic ligands; and
R$^1$ and R$^2$ are independently selected from hydrogen, hydrocarbyl, substituted hydrocarbyl, heteroatom-containing hydrocarbyl, substituted heteroatom-containing hydrocarbyl, and functional groups,
wherein any two or more of X$^1$, X$^2$, L$^1$, L$^2$, R$^1$, and R$^2$ can be taken together to form a cyclic group, and further wherein any one of X$^1$, X$^2$, L$^1$, L$^2$, R$^1$, and R$^2$ can be attached to a support.

3. The method of claim 2, wherein M is Ru or Os.

4. The method of claim 3, wherein M is Ru.

5. The method of claim 4, wherein:
R$^1$ is hydrogen, and R$^2$ is selected from C$_1$–C$_{20}$ alkyl, C$_2$–C$_{20}$ alkenyl, and C$_5$–C$_{20}$ aryl, optionally substituted with one or more moieties selected from C$_1$–C$_6$ alkyl, C$_1$–C$_6$ alkoxy, and phenyl;
L$^1$ and L$^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether; and
X$^1$ and X$^2$ are independently selected from hydrogen, halide, C$_1$–C$_{20}$ alkyl, C$_5$–C$_{20}$ aryl, C$_1$–C$_{20}$ alkoxy, C$_5$–C$_{20}$ aryloxy, C$_2$–C$_{20}$ alkoxycarbonyl, C$_6$–C$_{20}$ aryloxycarbonyl, C$_2$–C$_{20}$ acyl, C$_2$–C$_{20}$ acyloxy, C$_1$–C$_{20}$ alkylsulfonato, C$_5$–C$_{20}$ arylsulfonato, C$_1$–C$_{20}$ alkylsulfanyl, C$_5$–C$_{20}$ arylsulfanyl, C$_1$–C$_{20}$ alkylsulfinyl, or C$_5$–C$_{20}$ arylsulfinyl, any of which, with the exception of hydrogen and halide, are optionally further substituted with one or more groups selected from halide, C$_1$–C$_6$ alkyl, C$_1$–C$_6$ alkoxy, and phenyl.

6. The method of claim 5, wherein:
R$^2$ is selected from phenyl, vinyl, methyl, isopropyl, and t-butyl;
L$^1$ and L$^2$ are phosphines of the formula PR$^5$R$^6$R$^7$, where R$^5$, R$^6$, and R$^7$ are each independently aryl or C$_1$–C$_{10}$ alkyl; and
X$^1$ and X$^2$ are independently selected from halide, CF$_3$CO$_2$, CH$_3$CO$_2$, CFH$_2$CO$_2$, (CH$_3$)$_3$CO, (CF$_3$)$_2$(CH$_3$)CO, (CF$_3$)(CH$_3$)$_2$CO, PhO, MeO, EtO, tosylate, mesylate, and trifluoromethanesulfonate.

7. The method of claim 6, wherein:
R$^2$ is phenyl or vinyl;
L$^1$ and L$^2$ are selected from tricyclohexylphosphine, tricyclopentylphosphine, triisopropylphosphine, triphenylphosphine, diphenylmethylphosphine, and phenyldimethylphosphine; and $X^1$ and $X^2$ are halide.

8. The method of claim 7, wherein:

$R^2$ is phenyl;

$L^1$ and $L^2$ are the same, and are selected from tricyclohexylphosphine and tricyclopentylphosphine; and $X^1$ and $X^2$ are chloro.

9. The method of claim 4, wherein $L^1$ has the structure of formula (II)

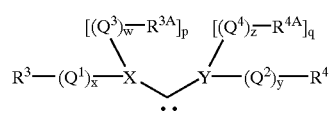

(II)

in which:

X and Y are heteroatoms selected from N, O, S, and P;

p is zero when X is O or S, and p is 1 when X is N or P;

q is zero when Y is O or S, and q is 1 when Y is N or P;

$Q^1$, $Q^2$, $Q^3$, and $Q^4$ are independently selected from hydrocarbylene, substituted hydrocarbylene, heteroatom-containing hydrocarbylene, substituted heteroatom-containing hydrocarbylene, and —(CO)—, and further wherein two or more substituents on adjacent atoms within Q may be linked to form an additional cyclic group;

w, x, y, and z are independently zero or 1; and $R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl, such that the transition metal complex is a ruthenium carbene complex having the structure of formula (IIA)

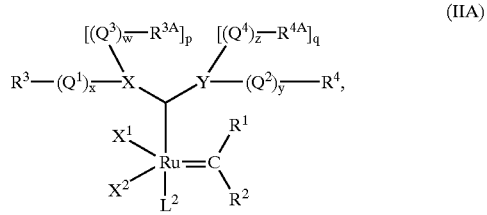

(IIA)

wherein any two or more of $X^1$, $X^2$, $L^2$, $R^1$, $R^2$, $R^3$, $R^{3A}$, $R^4$, and $R^{4A}$ can be taken together to form a cyclic group, and further wherein any one or more of $X^1$, $X^2$, $L^2$, $R^1$, $R^2$, $R^3$, $R^{3A}$, $R^4$, and $R^{4A}$ may be attached to a support.

10. The method of claim 9, wherein w, x, y, and z are zero, X and Y are N, and $R^{3A}$ and $R^{4A}$ are linked to form —Q—, such that the ruthenium carbene complex has the structure of formula (IV)

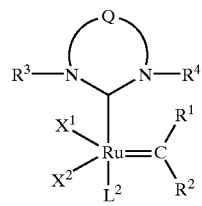

(IV)

wherein Q is a hydrocarbylene, substituted hydrocarbylene, heteroatom-containing hydrocarbylene, or substituted heteroatom-containing hydrocarbylene linker, and further wherein two or more substituents on adjacent atoms within Q may be linked to form an additional cyclic group.

11. The method of claim 10, wherein Q has the structure —$CR^8R^9$—$CR^{10}R^{11}$— or —$CR^8$=$CR^{10}$—, wherein $R^8$, $R^9$, $R^{10}$, and $R^{11}$ are independently selected from hydrogen, hydrocarbyl, substituted hydrocarbyl, heteroatom-containing hydrocarbyl, substituted heteroatom-containing hydrocarbyl, and functional groups, and or wherein any two of $R^8$, $R^9$, $R^{10}$, and $R^{11}$ may be linked together to form a substituted or unsubstituted, saturated or unsaturated ring.

12. The method of claim 11, wherein Q has the structure —$CR^8R^9$—$CR^{10}R^{11}$—, such that the ruthenium carbene complex has the structure of formula (V)

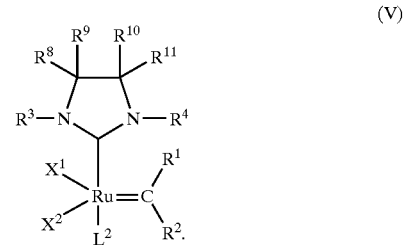

(V)

13. The method of claim 12, wherein:

$R^1$ is hydrogen, and $R^2$ is selected from $C_1$–$C_{20}$ alkyl, $C_2$–$C_{20}$ alkenyl, and aryl, optionally substituted with one or more moieties selected from $C_1$–$C_6$ alkyl, $C_1$–$C_6$ alkoxy, and phenyl;

$L^2$ is selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether;

$X^1$ and $X^2$ are independently selected from hydrogen, halide, $C_1$–$C_{20}$ alkyl, $C_5$–$C_{20}$ aryl, $C_1$–$C_{20}$ alkoxy, $C_5$–$C_{20}$ aryloxy, $C_2$–$C_{20}$ alkoxycarbonyl, $C_6$–$C_{20}$ aryloxycarbonyl, $C_2$–$C_{20}$ acyl, $C_2$–$C_{20}$ acyloxy, $C_1$–$C_{20}$ alkylsulfonato, $C_5$–$C_{20}$ arylsulfonato, $C_1$–$C_{20}$ alkylsulfanyl, $C_5$–$C_{20}$ arylsulfanyl, $C_1$–$C_{20}$ alkylsulfinyl, or $C_5$–$C_{20}$ arylsulfinyl, any of which, with the exception of hydrogen and halide, are optionally further substituted with one or more groups selected from halide, $C_1$–$C_6$ alkyl, $C_1$–$C_6$ alkoxy, and phenyl;

$R^3$ and $R^4$ are aromatic, substituted aromatic, heteroaromatic, substituted heteroaromatic, alicyclic, substituted alicyclic, heteroatom-containing alicyclic, or substituted heteroatom-containing alicyclic, composed of from one to about five rings; and $R^8$ and $R^{10}$ are hydrogen, and $R^9$ and $R^{11}$ are selected from hydrogen, lower alkyl and phenyl, or are linked to form a cyclic group.

14. The method of claim 13, wherein:

R² is selected from phenyl, vinyl, methyl, isopropyl, and t-butyl;

L² is a phosphine of the formula PR⁵R⁶R⁷, where $R^5$, $R^6$, and $R^7$ are each independently aryl or $C_1$–$C_{10}$ alkyl;

X¹ and X² are independently selected from halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate; and R³ and R⁴ are the same and are either aromatic or $C_7$–$C_{12}$ alicyclic, if aromatic, each having the structure of formula (VI)

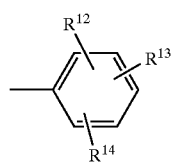

(VI)

in which $R^{12}$, $R^{13}$, and $R^{14}$ are each independently hydrogen, $C_1$–$C_{10}$ alkyl, $C_1$–$C_{10}$ alkoxy, $C_5$–$C_{14}$ aryl, substituted $C_5$–$C_{14}$ aryl, or halide.

15. The method of claim 14, wherein:

R² is phenyl or vinyl;

L² is selected from tricyclohexylphosphine, tricyclopentylphosphine, triisopropylphosphine, triphenylphosphine, diphenylmethylphosphine, and phenyldimethylphosphine;

X¹ and X² are halide;

R³ and R⁴ are mesityl, diisopinocamphenyl, or 2,4,2',6'-tetramethylbiphenylyl; and R⁹ and R¹¹ are hydrogen.

16. The method of claim 15, wherein:

R² is phenyl;

L² is selected from tricyclohexylphosphine and tricyclopentylphosphine;

X¹ and X² are chloro; and

R³ and R⁴ are mesityl.

17. The method of claim 1, wherein the olefin metathesis catalyst has the structure of formula (IIIA)

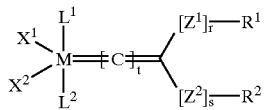

(IIIA)

wherein:

M is Ru or Os;

L¹ and L² are neutral electron donor ligands;

X¹ and X² are anionic ligands;

r and s are independently zero or 1;

t is an integer in the range of zero to 5;

R¹ and R² are independently selected from hydrogen, hydrocarbyl, substituted hydrocarbyl, heteroatom-containing hydrocarbyl, substituted heteroatom-containing hydrocarbyl, and functional groups; and Z¹ and Z² are independently selected from —O—, —S—, —NR²—, —PR²—, —P(=O)R²—, —P(OR²)—, —P(=O)(OR²)—, —C(=O)—, —C(=O)O—, —OC(=O)—, —OC(=O)O—, —S(=O)—, or —S(=O)₂—, wherein any two or more of X¹, X², L¹, L², Z¹, Z², R¹, and R² may be taken together to form a cyclic group, and further wherein any one or more of X¹, X², L¹, L², Z¹, Z², R¹, and R² may be attached to a support.

18. The method of claim 1, wherein the olefin metathesis catalyst has the structure of formula (IIIB)

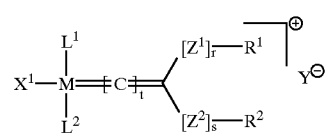

(IIIB)

wherein:

M is Ru or Os;

L¹ and L² are neutral electron donor ligands;

X¹ is an anionic ligand;

r and s are independently zero or 1;

t is an integer in the range of zero to 5;

R¹ and R² are independently selected from hydrogen, hydrocarbyl, substituted hydrocarbyl, heteroatom-containing hydrocarbyl, substituted heteroatom-containing hydrocarbyl, and functional groups; and Z¹ and Z² are independently selected from —O—, —S—, —NR²—, —PR²—, —P(=O)R²—, —P(OR²)—, —P(=O)(OR²)—, —C(=O)—, —C(=O)O—, —OC(=O)—, —OC(=O)O—, —S(=O)—, or —S(=O)₂—, wherein any two or more of X¹, L¹, L², Z¹, Z², R¹, and R² may be taken together to form a cyclic group, and further wherein any one or more of X¹, L¹, L², Z¹, Z², R¹, and R² may be attached to a support.

19. The method of claim 1, wherein the olefin metathesis catalyst has the structure of formula (IIIC)

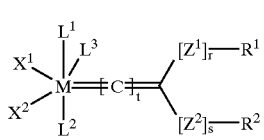

(IIIC)

wherein:

M is Ru or Os;

L¹, L², and L³ are neutral electron donor ligands;

X¹ and X² are anionic ligands;

r and s are independently zero or 1;

t is an integer in the range of zero to 5;

R¹ and R² are independently selected from hydrogen, hydrocarbyl, substituted hydrocarbyl, heteroatom-containing hydrocarbyl, substituted heteroatom-containing hydrocarbyl, and functional groups; and Z¹ and Z² are independently selected from —O—, —S—, —NR²—, —PR²—, —P(=O)R²—, —P(OR²)—, —P(=O)(OR²)—, —C(=O)—, —C(=O)O—, —OC(=O)—, —OC(=O)O—, —S(=O)—, or —S(=O)₂—, wherein any two or more of X¹, L¹, L², Z¹, Z², R¹, and R² may be taken together to form a cyclic group, and further wherein any one or more of X¹, L¹, L², Z¹, Z², R¹, and R² may be attached to a support.

20. The method of claim 2, wherein the olefin monomer has the structure of formula (VII)

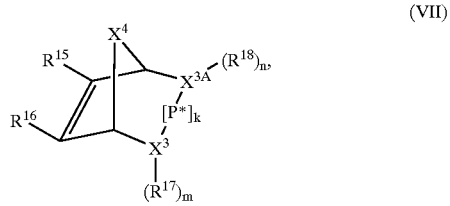

wherein:
  $X^3$ and $X^{3A}$ are heteroatoms selected from O, N and S;
  $X^4$ is a one-atom or two-atom linkage;
  k is zero when one or both of $X^3$ or $X^{3A}$ are N, and k is 1 when neither $X^3$ or $X^{3A}$ is N;
  m is zero when $X^3$ is O or S, and m is 1 when $X^3$ is N;
  n is zero when $X^{3A}$ is O or S, and n is 1 when $X^{3A}$ is N;
  one of $R^{15}$ and $R^{16}$ is hydrogen and the other is selected from hydrogen, hydrocarbyl, substituted hydrocarbyl, heteroatom-containing hydrocarbyl, substituted heteroatom-containing hydrocarbyl, and —(L)v—Fn wherein v is zero or 1, L is hydrocarbylene, substituted hydrocarbylene and/or heteroatom-containing hydrocarbylene, and Fn is a functional group;
  P* is a protecting group that is inert under said reaction conditions but removable from the synthesized polymer; and
  $R^{17}$ and $R^{18}$ are independently selected from hydrogen, hydrocarbyl, substituted hydrocarbyl, heteroatom-containing hydrocarbyl, substituted heteroatom-containing hydrocarbyl, and amino protecting groups, wherein $R^{17}$ and $R^{18}$ may be taken together to form a cyclic group.

21. The method of claim 20, wherein $R^{15}$ and $R^{16}$ are hydrogen.

22. The method of claim 21, wherein $X^4$ has the formula —$CR^{19}R^{20}$—$(X^5)_h$— wherein h is zero or 1, $X^5$ is $CR^{21}R^{22}$, O, S, or $NR^{23}$, and $R^{19}$, $R^{20}$, $R^{21}$, $R^{22}$, and $R^{23}$ are independently selected from hydrogen, substituted hydrocarbyl, heteroatom-containing hydrocarbyl, substituted heteroatom-containing hydrocarbyl, and functional groups.

23. The method of claim 22, wherein h is zero.

24. The method of claim 23, wherein $R^{19}$ and $R^{20}$ are hydrogen.

25. The method of claim 20, wherein $X^3$ and $X^{3A}$ are different.

26. The method of claim 25, wherein k and m are zero, n is 1, $X^3$ is O, $X^{3A}$ is N, and $R^{18}$ is an amino protecting group.

27. The method of claim 20, wherein $X^3$ and $X^{3A}$ are the same.

28. The method of claim 27, wherein $R^{18}$ is identical to $R^{17}$, and n is identical to m, such that the synthesized polymer is an unsaturated regioregular polymer comprised of recurring units having the structure of formula (VIII)

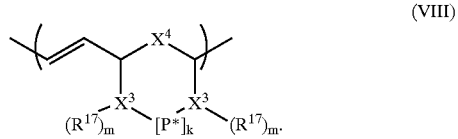

29. The method of claim 28, wherein k is zero, m is 1, n is 1, $X^3$ is N, and the $R^{17}$ substituents taken together form a cyclic group.

30. The method of claim 29, further comprising hydrogenating the unsaturated regioregular polymer to provide a saturated regioregular polymer comprised of recurring units having the structure of formula (IX)

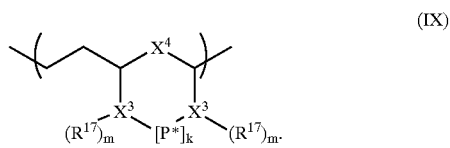

31. The method of claim 30, further comprising treating the saturated regioregular polymer with a deprotecting reagent effective to provide a deprotected regioregular polymer comprised of recurring units having the formula (X)

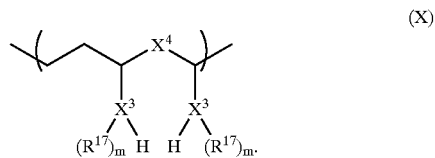

32. The method of either claim 29 or claim 30, wherein $X^3$ is O and $X^4$ is methylene.

33. The method of claim 32, wherein P* is selected from cyclic acetals, cyclic ketals, and silylene groups having the structure —Si($R^{24}$)$_2$— wherein $R^{24}$ is tertiary alkyl.

34. The method of claim 31, wherein $X^3$ is O and $X^4$ is methylene.

35. The method of either claim 29 or claim 30, wherein $X^3$ is S, $X^4$ is methylene, and P* is methylene, benzylidene, or isopropylidene.

36. The method of claim 31, wherein $X^3$ is S and $X^4$ is methylene.

37. The method of claim 31, wherein the deprotected regioregular polymer has a number average molecular weight $M_n$ in the range of approximately 1,000 to approximately 1,000,000.

38. The method of claim 1, wherein the olefin monomer is contacted with the olefin metathesis catalyst in the presence of an α,ω-difunctional olefin, and the polymer synthesized is a telechelic polymer.

39. The method of claim 9, wherein the olefin monomer is contacted with the rutheniuim carbene complex in the presence of an α,ω-difunctional olefin, and the polymer synthesized is a telechelic polymer.

40. The method of claim 39, wherein the olefin monomer has the structure of formula (VII)

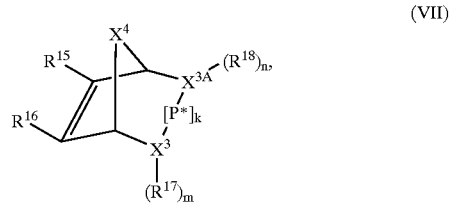

wherein:
  $X^3$ and $X^{3A}$ are heteroatoms selected from O, N and S;
  $X^4$ is a one-atom or two-atom linkage;
  k is zero when one or both of $X^3$ or $X^{3A}$ are N, and k is 1 when neither $X^3$ or $X^{3A}$ is N;
  m is zero when $X^3$ is O or S, and m is 1 when $X^3$ is N;

n is zero when $X^{3A}$ is O or S, and n is 1 when $X^{3A}$ is N;

one of $R^{15}$ and $R^{16}$ is hydrogen and the other is selected from hydrogen, hydrocarbyl, substituted hydrocarbyl, heteroatom-containing hydrocarbyl, substituted heteroatom-containing hydrocarbyl, and —(L)v—Fn wherein v is zero or 1, L is hydrocarbylene, substituted hydrocarbylene and/or heteroatom-containing hydrocarbylene, and Fn is a functional group;

P* is a protecting group that is inert under said reaction conditions but removable from the synthesized polymer; and $R^{17}$ and $R^{18}$ are independently selected from hydrogen, hydrocarbyl, substituted hydrocarbyl, heteroatom-containing hydrocarbyl, substituted heteroatom-containing hydrocarbyl, and amino protecting groups, and wherein $R^{17}$ and $R^{18}$ may be taken together to form a cyclic group.

41. The method of claim 40, wherein $R^{15}$ and $R^{16}$ are hydrogen.

42. The method of claim 41, wherein $X^4$ has the formula —$CR^{19}R^{20}$—$(X^5)_h$— wherein h is zero or 1, $X^5$ is $CR^{21}R^{22}$, O, S, or $NR^{23}$, and $R^{19}$, $R^{20}$, $R^{21}$, $R^{22}$, and $R^{23}$ are independently selected from hydrogen, substituted hydrocarbyl, heteroatom-containing hydrocarbyl, substituted heteroatom-containing hydrocarbyl, and functional groups.

43. The method of claim 42, wherein h is zero.

44. The method of claim 43, wherein $R^{19}$ and $R^{20}$ are hydrogen.

45. The method of claim 44, wherein h is 1, $X^5$ is $CR^{21}R^{22}$, and $R^{19}$, $R^{20}$, $R^{21}$, and $R^{22}$ are hydrogen.

46. The method of claim 40, wherein $X^3$ and $X^{3A}$ are different.

47. The method of claim 46, wherein k and m are zero, n is 1, $X^3$ is O, $X^{3A}$ is N, and $R^{18}$ is an amino protecting group.

48. The method of claim 40, wherein $X^3$ and $X^{3A}$ are the same.

49. The method of claim 48, wherein $R^{18}$ is identical to $R^{17}$, n is identical to m, and the α,ω-difunctional olefin has the structure of formula (XI)

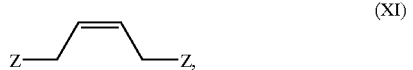

(XI)

such that the telechelic polymer is an unsaturated regioregular polymer having the structure of formula (XII)

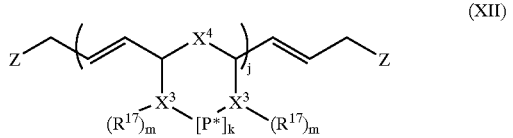

(XII)

wherein:
j is the number of recurring monomer units in the polymer; and
Z comprises a functional group.

50. The method of claim 49, wherein Z is selected from halide, hydroxyl, sulfhydryl, $C_2$–$C_{20}$ acyloxy, $C_2$–$C_{20}$ alkoxycarbonyl, $C_6$–$C_{20}$ aryloxycarbonyl, halocarbonyl, $C_2$–$C_{20}$ alkylcarbonato, $C_6$–$C_{20}$ arylcarbonato, carboxy, carbamoyl, mono-substituted carbamoyl, disubstituted carbamoyl, thiocarbamoyl, carbamido, cyano, cyanato, formyl, thioformyl, amino, mono-substituted amino, di-substituted amino, imino, alkylimino, arylimino, nitro, nitroso, sulfo, $C_1$–$C_{20}$ alkylsulfanyl, $C_5$–$C_{20}$ arylsulfanyl, $C_1$–$C_{20}$ alkylsulfinyl, $C_5$–$C_{20}$ arylsulfinyl, $C_1$–$C_{20}$ alkylsulfonyl, arylsulfonyl, boryl, phosphono, phospho, and phosphino.

51. The method of claim 49, wherein k is zero, m is 1, n is 1, $X^3$ is N, and the $R^{17}$ substituents taken together form a cyclic group.

52. The method of claim 49, wherein k is 1, m is zero, n is zero, and $X^3$ is O or S.

53. The method of claim 52, further comprising hydrogenating the unsaturated regioregular polymer to provide a saturated regioregular polymer comprised of recurring units having the structure of formula (XIII)

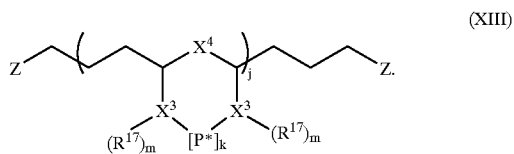

(XIII)

54. The method of claim 53, further comprising treating the saturated regioregular polymer with a deprotecting reagent effective to provide a deprotected regioregular polymer comprised of recurring units having the formula (XIV)

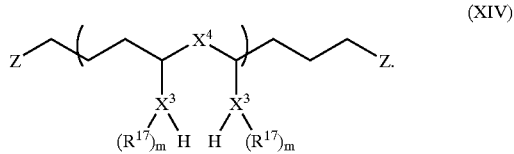

(XIV)

55. The method of claim 49 or claim 53, wherein $X^3$ is O and $X^4$ is methylene.

56. The method of claim 55, wherein P* is selected from cyclic acetals, cyclic ketals, and silylene group having the structure —$Si(R^{24})_2$— wherein $R^{24}$ is tertiary alkyl.

57. The method of claim 54, wherein $X^3$ is O and $X^4$ is methylene.

58. The method of claim 49 or claim 53, wherein $X^3$ is S, $X^4$ is methylene, and P* is methylene, benzylidene, or isopropylidene.

59. The method of claim 54, wherein $X^3$ is S and $X^4$ is methylene.

60. The method of claim 49, wherein Z is selected from hydroxyl, sulfhydryl, $C_2$–$C_{20}$ acyloxy, carboxy, $C_2$–$C_{12}$ alkoxycarbonyl, $C_6$–$C_{15}$ aryloxycarbonyl, amino, carbamoyl, and formyl.

61. The method of claim 54, wherein the deprotected regioregular polymer has a number average molecular weight $M_n$ in the range of approximately 1,000 to approximately 1,000,000.

* * * * *